(12) United States Patent
Tang et al.

(10) Patent No.: US 10,456,667 B2
(45) Date of Patent: Oct. 29, 2019

(54) TOUCHSCREEN-BASED CONTROL METHOD AND TERMINAL

(71) Applicant: Tencent Technology (Shenzhen) Company Limited, Shenzhen (CN)

(72) Inventors: Yong Tang, Shenzhen (CN); Changyan Liao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 181 days.

(21) Appl. No.: 15/627,107

(22) Filed: Jun. 19, 2017

(65) Prior Publication Data

US 2017/0340959 A1   Nov. 30, 2017

Related U.S. Application Data

(63) Continuation of application No. PCT/CN2016/070598, filed on Jan. 11, 2016.

(30) Foreign Application Priority Data

Jun. 16, 2015   (CN) .......................... 2015 1 0334762

(51) Int. Cl.
*A63F 13/2145*   (2014.01)
*G06F 3/0484*   (2013.01)
(Continued)

(52) U.S. Cl.
CPC .......... *A63F 13/2145* (2014.09); *A63F 13/40* (2014.09); *G06F 3/044* (2013.01);
(Continued)

(58) Field of Classification Search
USPC ........................................................ 463/31
See application file for complete search history.

(56) References Cited

U.S. PATENT DOCUMENTS

| | | |
|---|---|---|
| 2007/0192749 A1 | 8/2007 | Baudisch |
| 2013/0241829 A1 | 9/2013 | Kim |
| 2013/0278530 A1 | 10/2013 | Hirata |
| 2014/0101587 A1 | 4/2014 | Sekine |

(Continued)

FOREIGN PATENT DOCUMENTS

| | | |
|---|---|---|
| CN | 101527745 A | 9/2009 |
| CN | 102436663 A | 5/2012 |

(Continued)

OTHER PUBLICATIONS

Tencent Technology, ISR, PCT/CN2016/070598, dated Apr. 13, 2016, 2 pgs.

(Continued)

*Primary Examiner* — Pierre E Elisca
(74) *Attorney, Agent, or Firm* — Morgan, Lewis & Bockius LLP

(57) ABSTRACT

A touchscreen-based control method is performed at a terminal having one or more processors, memory for storing programs, and a touchscreen, the method including: detecting a first touch point acting on a first icon displayed on the touchscreen; in response to detecting the first touch point, displaying an auxiliary control region and a candidate effect range region on the touchscreen, an area of the candidate effect range region being greater than an area of the auxiliary control region and establishing a mapping relationship between a location of the candidate effect range region and a location of the auxiliary control region; obtaining a first effect range according to a location of the first touch point when the first touch point is moved into the auxiliary control region; and performing, on a virtual target in the obtained first effect range, a first operation corresponding to the first icon.

17 Claims, 19 Drawing Sheets

(51) Int. Cl.
*A63F 13/40* (2014.01)
*G06F 3/041* (2006.01)
*G06F 3/044* (2006.01)
*G06F 3/0481* (2013.01)
*G06F 3/0488* (2013.01)
*A63F 9/24* (2006.01)

(52) U.S. Cl.
CPC .......... *G06F 3/0416* (2013.01); *G06F 3/0484* (2013.01); *G06F 3/0488* (2013.01); *G06F 3/04817* (2013.01); *A63F 2009/241* (2013.01); *A63F 2300/1075* (2013.01); *G06F 2203/04808* (2013.01)

(56) References Cited

U.S. PATENT DOCUMENTS

2015/0205522 A1   7/2015   Zeng
2018/0237140 A1*   8/2018   Li ........................... G08C 17/02
2018/0241931 A1*   8/2018   Li ........................... G08C 17/02

FOREIGN PATENT DOCUMENTS

| CN | 102819394 A | 12/2012 |
|---|---|---|
| CN | 103270485 A | 8/2013 |
| CN | 103412725 A | 11/2013 |
| CN | 104076986 A | 10/2014 |
| CN | 104750416 A | 7/2015 |
| CN | 104898953 A | 9/2015 |
| RU | 146516 U1 | 10/2014 |

OTHER PUBLICATIONS

Tencent Technology, Written Opinion, PCT/CN2016/070598, dated Apr. 28, 2016, 6 pgs.

Tencent Technology, IPRP, PCT/CN2016/070598, dated Dec. 19, 2017, 7 pgs.

Baudisch et al: "Drg-andPop and Drag-and-Pick: Techniques for Accessin Remote Screen Content on Touch-and Pen-Operated Systems" Human-Computer Interaction/ Interact 03, IFIP TC 13 International Conference on Human-Computer Interaction, Sep. 1-5, 2003, Zurich, Switzerland, los Press, Amsterdam, NL, Sep. 1, 2003, pp. 57-64, XP002618610, ISBN: 978-1-58603-363-7.

Maxime Collomb et al: "Improving drag-and-drop on wall-size displays" Graphics Interface 2005: Proceedings; Victoria, British Columbia, May 9-11, 2005, Canadian Information Processing Society, 403 King Street West, Suite 205 Toronto, ONT. M5U 1LS Canada, May 7, 2005 8 pgs.

* cited by examiner

TOUCHSCREEN-BASED CONTROL METHOD AND TERMINAL

PRIORITY CLAIM AND RELATED APPLICATION

This application is a continuation application of PCT Patent Application No. PCT/CN2016/070598, entitled "TOUCHSCREEN-BASED CONTROL METHOD AND TERMINAL" filed on Jan. 11, 2016, which claims priority to Chinese Patent Application No. 201510334762.X, entitled "TOUCHSCREEN-BASED CONTROL METHOD AND TERMINAL" filed on Jun. 16, 2015, both of which are incorporated by reference in their entirety.

FIELD OF THE TECHNOLOGY

The present disclosure relates to the field of control technologies, and in particular, to a touchscreen-based control method and a terminal.

BACKGROUND OF THE DISCLOSURE

In multiplayer online battle arena games (MOBA games), a user needs to control a game character to cast a skill. At present, a game character may be conveniently controlled on a desktop computer by using an input device such as a keyboard or a mouse, to cast a skill. However, an operation of a mobile terminal having a touchscreen is greatly different from that of the desktop computer. A control method originally used on a desktop computer for controlling a game character to cast a skill in the MOBA games is difficult to be directly applied to a mobile terminal having a touchscreen.

In a conventional technology, there is a touchscreen-based control method for controlling a virtual target to cast a skill in the MOBA games. Referring to FIG. 1, a mobile terminal displays one or more skill icons on the touchscreen. A user touches a skill icon 102 that is displayed on the touchscreen with a finger, drags the skill icon 102 to a target location 104 on the touchscreen, and then leaves the touchscreen, to control a controlled user game character 106 to cast a skill corresponding to the skill icon 102. In this case, the mobile terminal draws an effect range 108 of the skill corresponding to the skill icon 102. The effect range 108 covers the target location 104. In this way, after the skill is cast, if there is another virtual target 110 in the effect range 108, the virtual target 110 is affected by the skill corresponding to the skill icon 102. Specifically, a game attribute of the virtual target 110 increases or decreases, or mobility of the virtual target 110 is restricted.

However, in the conventional touchscreen-based control method for controlling a game character to cast a skill in the MOBA games, a user needs to perform a drag operation in a large range on the touchscreen with a finger, and may cover the target that the user wants to effect on the touchscreen. Therefore, the operation is extremely inconvenient, and operation efficiency is affected.

SUMMARY

A touchscreen-based control method and a terminal that are disclosed in this application resolve one or more problems described in the background and other problems.

A first aspect of the embodiments of the present invention provides a touchscreen-based control method, including:
    detecting a first touch point acting on a first icon displayed on a touchscreen;
    displaying an auxiliary control region and a candidate effect range region, an area of the candidate effect range region being greater than an area of the auxiliary control region;
    obtaining a first effect range according to a location of the first touch point, and a mapping relationship between a location of the candidate effect range region and a location of the auxiliary control region when the first touch point is moved into the auxiliary control region; and
    performing, on a virtual target in the obtained first effect range, a first operation corresponding to the first icon.

A second aspect of the embodiments of the present invention provides a terminal, including a nonvolatile storage medium and a processor, the nonvolatile storage medium storing instructions, and when the instructions are executed by the processor, the processor being enabled to perform the following steps:
    detecting a first touch point acting on a first icon displayed on a touchscreen;
    displaying an auxiliary control region and a candidate effect range region, an area of the candidate effect range region being greater than an area of the auxiliary control region;
    obtaining a first effect range according to a location of the first touch point, and a mapping relationship between a location of the candidate effect range region and a location of the auxiliary control region when the first touch point is moved into the auxiliary control region; and
    performing, on a virtual target in the obtained first effect range, a first operation corresponding to the first icon.

BRIEF DESCRIPTION OF THE DRAWINGS

To describe the technical solutions in embodiments of the present invention or in the existing technology more clearly, the following briefly introduces the accompanying drawings required for describing the embodiments or the existing technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make objectives, technical solutions, and advantages of the present disclosure clearer and more comprehensible, the following further describes the present disclosure in detail with reference to the accompanying drawings and embodiments. It should be understood that specific embodiments described herein are merely used to explain the present disclosure but are not intended to limit the present disclosure.

Figure 1:
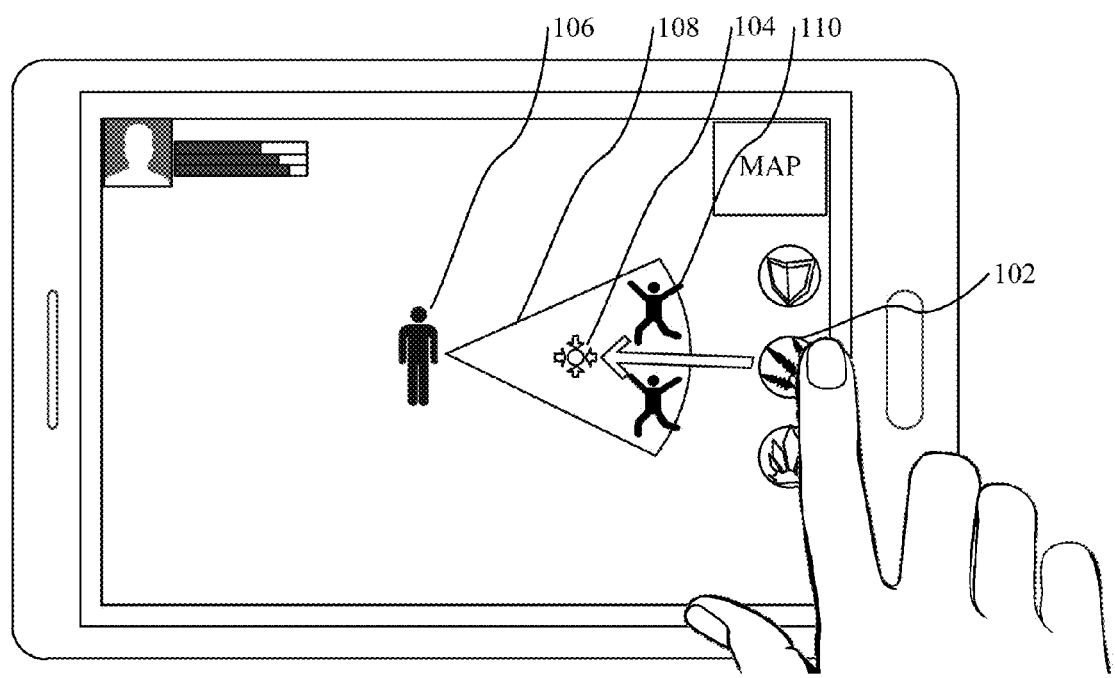
FIG. 1 is a schematic operation diagram of a conventional touchscreen-based control method for controlling a game character to cast a skill in MOBA games.
Figure 2:
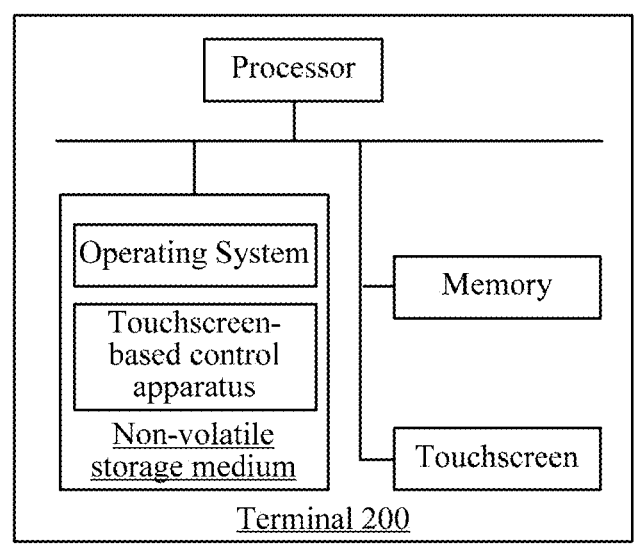
FIG. 2 is a schematic structural composition diagram of a terminal according to an embodiment.

As shown in FIG. 2, in an embodiment, a terminal 200 is provided, including: a processor, a nonvolatile storage medium, a memory, and a touchscreen that are connected by using a system bus. The processor has a computing function and a function of controlling work of the entire terminal 200. The processor is configured to execute a touchscreen-based control method. The nonvolatile storage medium includes a magnetic storage medium, an optical storage medium, and a flash storage medium. The nonvolatile storage medium stores an operating system and a touchscreen-based control apparatus. The touchscreen-based control apparatus is configured to implement a touchscreen-based control method. The memory is configured to provide a cache for the operating system and the touchscreen-based control apparatus. The touchscreen includes a resistive touchscreen, a capacitive sensing touchscreen, an infrared touchscreen, and a surface acoustic wave touchscreen. The touchscreen is configured to: detect a touch operation acting on the touchscreen, and return touch data to the processor for processing. The touchscreen is further configured to display information as instructed by the processor. The terminal 200 may be a public service device having a touchscreen, for example, a large game console or a public query machine; or the terminal 200 may be a mobile terminal. The mobile terminal includes a mobile phone and a tablet computer.

Figure 3:
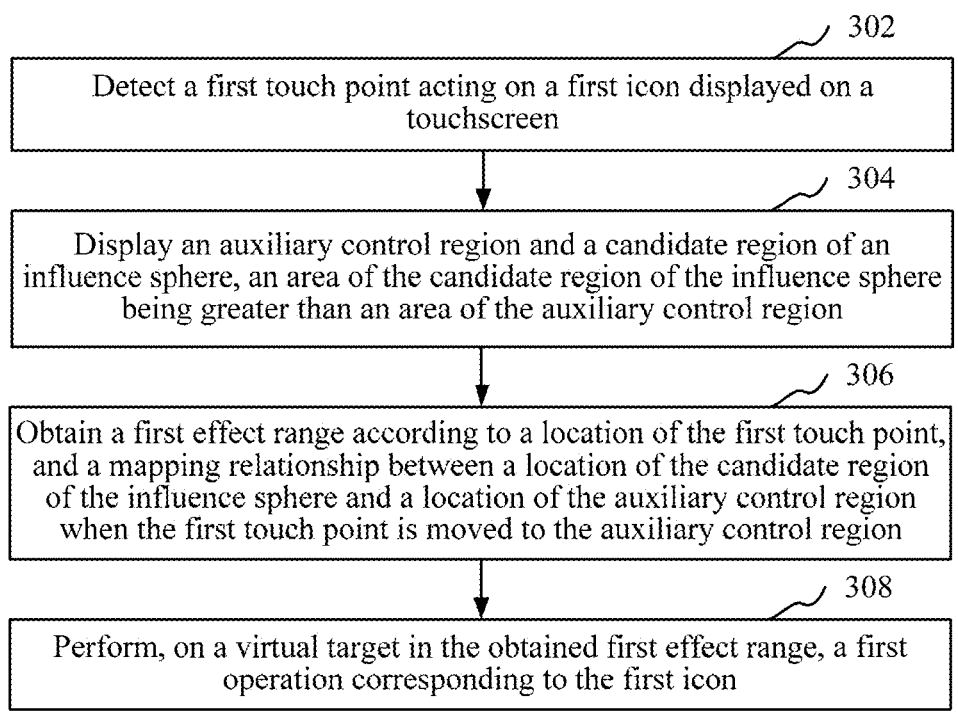
FIG. 3 is a schematic flowchart of a touchscreen-based control method according to an embodiment.

As shown in FIG. 3, in an embodiment, a touchscreen-based control method is provided. In this embodiment, an example in which the method is applied to the terminal 200 in FIG. 2 is used for description. The method specifically includes the following steps:

Step 302: Detect a first touch point acting on a first icon displayed on a touchscreen.

Figure 4:
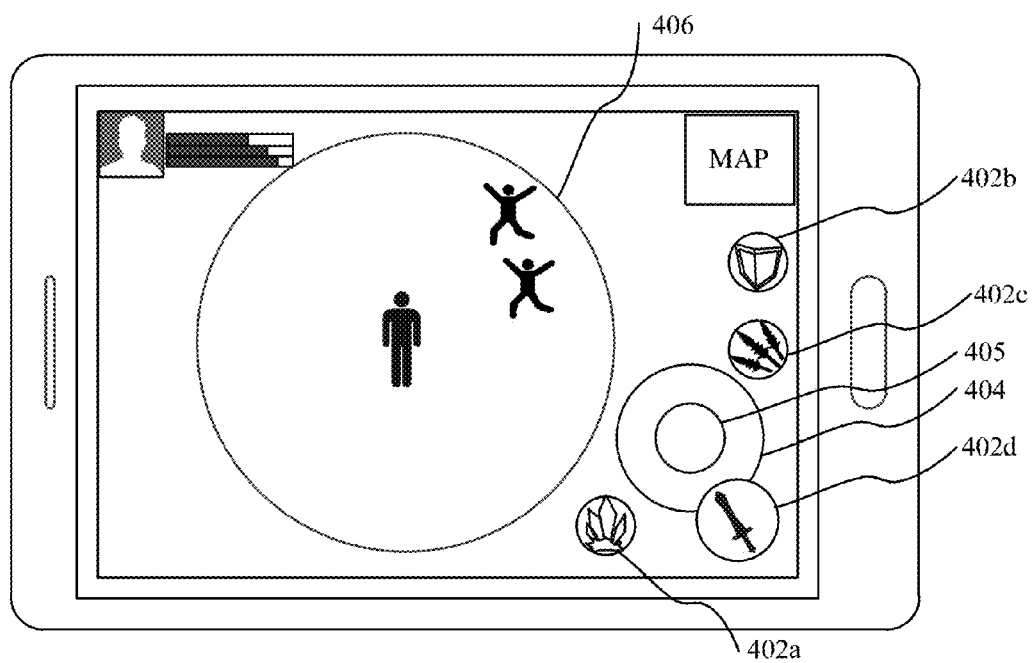
FIG. 4 shows a first interface of implementing a touchscreen-based control method on a terminal according to an embodiment.

Specifically, an icon is used for intuitively displaying an operation that can be implemented by this icon. Each icon corresponds to one operation. The touchscreen displays at least one icon. Shapes and sizes of icons may be the same or may be different. Icons may be distinguished from each other by using at least one of: texts, symbols, patterns, or colors in the icons, or a combination thereof. As shown in FIG. 4, icons 402a, 402b, 402c, and 402d may be displayed on the touchscreen.

The terminal 200 displays an icon on the touchscreen, and the icon displayed on the touchscreen includes at least a first icon. "First" in the first icon, the first touch point, or the like is used for identifying the icon or the touch point, and is not used for limiting a quantity. Specifically, a user may touch the touchscreen by using a touch subject such as a finger or a capacitive stylus. In this way, the terminal 200 can detect a touch point triggered by the touch subject on the touchscreen. If the terminal 200 detects that there is a touch point in a region where the touchscreen displays the first icon, the touch point is the first touch point acting on the first icon.

Step 304: Display an auxiliary control region and a candidate effect range region, an area of the candidate effect range region being greater than an area of the auxiliary control region.

Specifically, the auxiliary control region is a region in which a user performs an operation, and the candidate effect range region is a selection region used for determining a first effect range of a first operation corresponding to the first icon. The auxiliary control region and the candidate effect range region may intersect with each other or may be separated from each other. Referring to FIG. 4, the terminal 200 displays an auxiliary control region 404 and a candidate effect range region 406. When the candidate effect range region is drawn for display, the candidate effect range region may be deformed according to a requirement on a stereoscopic display effect, to achieve an effect that the candidate effect range region may have a corresponding shape under the stereoscopic effect. For example, a circular candidate effect range region is elliptic when being drawn, but it is visually circular.

The area of the candidate effect range region is greater than the area of the auxiliary control region. This may ensure that a user operates in the smaller auxiliary control region during operation, and does not need to move or operate in a large region of the entire touchscreen.

The auxiliary control region and the candidate effect range region may be geometrically similar. For example, both are circles, ellipses, polygons, or irregular figures whose edges form same shapes. Shapes of the auxiliary control region and the candidate effect range region may be different. For example, the auxiliary control region may be a circle, while the corresponding candidate effect range region may be a rectangle; or the auxiliary control region may be a circle, while the corresponding candidate effect range region may be a polygon, as long as a location in the auxiliary control region can be mapped to a corresponding location in the candidate effect range region.

In an embodiment, the auxiliary control region and the candidate effect range region are both centrosymmetric figures or axisymmetric figures. If a figure that is obtained after an original figure is rotated by 180 degrees around the central point of the original figure overlaps the original figure, the original figure is referred to as a centrosymmetric figure, and the central point is referred to as a center of symmetry. The centrosymmetric figure may be, for example, a circle or a polygon with an even quantity of sides.

In an embodiment, the auxiliary control region and the candidate effect range region are both axisymmetric figures. After an axisymmetric figure is folded along the axis of symmetry thereof, two parts separated by the axis of symmetry of the axisymmetric figure completely overlap each other. The axisymmetric figure may be, for example, a circle, a polygon, or an ellipse.

In an embodiment, the location of the candidate effect range region is determined according to a location of a current user game character. The current user game character refers to a game character currently controlled by the user of the terminal 200. Specifically, the terminal 200 may draw the candidate effect range region by using a location of the current user game character as a central point, or may draw the candidate effect range region by using a location of the current user game character as a starting point.

In an embodiment, the terminal 200 may display, in the auxiliary control region, a figure that is geometrically similar to the auxiliary control region and whose area is less than the area of the auxiliary control region, for example, 405 in FIG. 4. The area of the figure is positively correlated to the first effect range of the first icon. In this embodiment, an area of the first effect range of the first operation corresponding to the first icon may be intuitively displayed by using a figure in the auxiliary control region, so that the user adjusts the location of the first effect range during operation according to the size of the first effect range.

Step 306: Obtain a first effect range according to a location of the first touch point, and a mapping relationship between a location of the candidate effect range region and a location of the auxiliary control region when the first touch point is moved into the auxiliary control region.

Specifically, the terminal 200 may detect movement of the first touch point, and when the first touch point is moved, control the first icon to move along a moving trace of the first touch point. For example, the first icon may be always drawn and refreshed by using the first touch point as a center. In this way, the first icon visually moves while a touch subject moves.

The location in the auxiliary control region has a mapping relationship with the location of the candidate effect range region. The location of the first touch point in the auxiliary control region may be mapped to the location of the first effect range in the candidate effect range region according to the mapping relationship. The first effect range may be a circle, a sector, a straight line, or any irregular shape.

In an embodiment, if the auxiliary control region and the candidate effect range region are geometrically similar, the terminal 200 may determine the location of the first effect range relative to the candidate effect range region according to the location of the first touch point relative to the auxiliary control region, and a ratio of the auxiliary control region to the candidate effect range region.

In an embodiment, if the auxiliary control region and the candidate effect range region are not geometrically similar, the terminal 200 may establish a nonlinear mapping relationship between a location in the auxiliary control region and a location in the candidate effect range region in advance, so that the terminal 200 may determine the location of the first effect range relative to the candidate effect range region according to the nonlinear mapping relationship and the location of the first touch point relative to the auxiliary control region.

Figure 5:
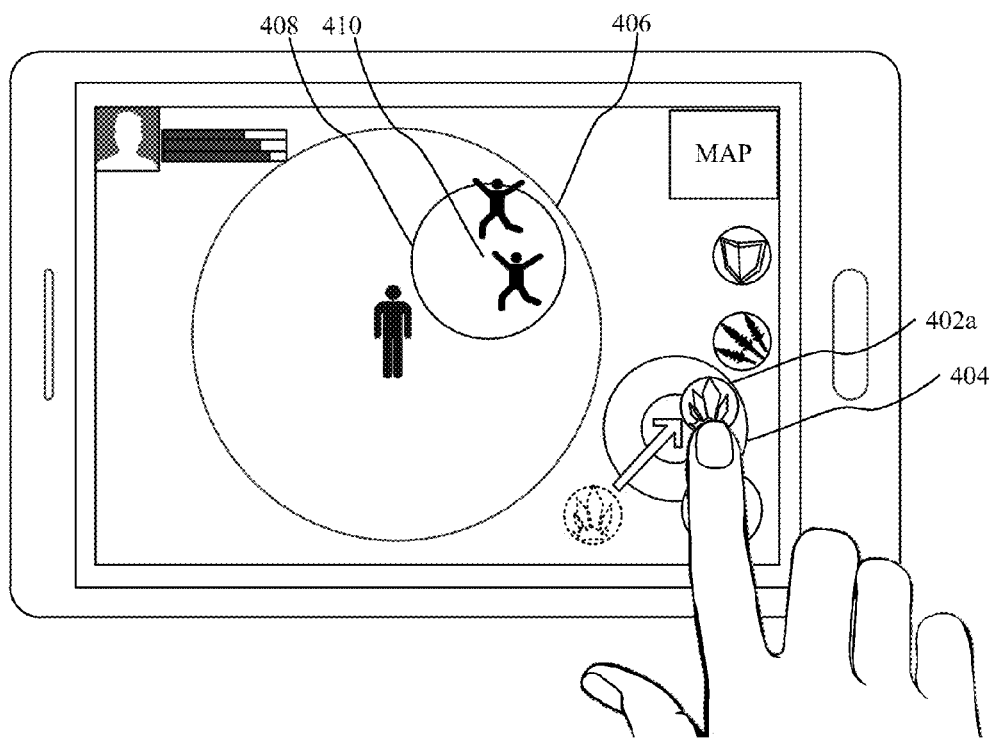
FIG. 5 shows a second interface of implementing a touchscreen-based control method on a terminal according to an embodiment.

For example, referring to FIG. 5, a user touches a first icon 402a, and a first touch point is generated. The user drags the first icon to an auxiliary control region 404. In this case, the first icon 402a is at an upper right location relative to the auxiliary control region 404. A representative location 410 of a first effect range 408 relative to a candidate effect range region 406 may be calculated. A dotted line in FIG. 5 represents the first icon and represents a location of the first icon before movement.

Step 308: Perform, on a virtual target in the obtained first effect range, a first operation corresponding to the first icon.

Specifically, when detecting an operation determining event, the terminal 200 may perform, on the virtual target in the obtained first effect range, the first operation corresponding to the first icon. The operation determining event is an event representing that a user determines the location of the first effect range. In an embodiment, the operation determining event includes: The touch point disappears, and the touch point stays static within first preset duration, and second preset duration is reached since the touch point is detected.

Specifically, that the first touch point disappears is an event caused when a touch subject leaves a touch surface of the touchscreen. That the first touch point stays static within the first preset duration represents that the touch subject touches a same location of the touchscreen for a period longer than the first preset duration. That the second preset duration is reached since the first touch point is detected may prevent the user from performing determining within the second preset duration. If the second preset duration is reached, it indicates that the user performs determining. The first preset duration and the second preset duration may be set according to needs.

The virtual target is a digital operational object. In an embodiment, the virtual target includes a player character and a non-player character (NPC). The player character refers to a game character controlled by a player. In MOBA games, the player character may be referred to as a hero. Each hero has a respective name and has skills with various effects. The player character has a growth feature. Various player-controlled game characters change due to a game progress. The non-player character is a game character automatically controlled in the MOBA games. Various game attributes of the non-player character are usually constant or the growth feature is relatively weak. The non-player character may be at least one of: a cavalry, an infantry, an archer, a mage, an archer tower, a turret, a magic tower, a demolisher, a mortar, a beast soldier, or the like.

In an embodiment, the first operation includes at least one of: changing a game attribute value of the virtual target, adding a specified state to the virtual target, or restricting mobility of the virtual target. The changing herein may be increasing or decreasing. Changing the game attribute value of the virtual target includes: changing a physical strength value, changing a magic value, changing an agility attribute value, changing a strength attribute value, and changing an intelligence attribute value. A specified state includes at least one of: an unbeatable state, a magic attack-immune status, a physical attack-immune status, an ethereal status, a poisoned status, a decelerating status, an accelerating status, or the like. Restriction of mobility includes at least one of: freeze of the virtual target caused by a freezing skill, or daze of the virtual target caused by a daze skill.

According to the touchscreen-based control method, a touchscreen displays icons. A user taps a first icon of the icons displayed on the touchscreen. The touchscreen displays an auxiliary control region having a smaller area and a candidate effect range region having a larger area. A location of the auxiliary control region has a mapping relationship with a location of the candidate effect range region. In this way, when the user taps the first icon and drags the first icon to the auxiliary control region, the user may adjust a location of a first effect range relative to the candidate effect range region in a large region by adjusting a location of a first touch point relative to the auxiliary control region in a small region, and further perform, on a virtual target in the first effect range, a first operation corresponding to the first icon. The user does not need to perform a drag operation in a large region, thereby improving operation convenience, and the first effect range can be accurately positioned.

It may be understood that the touchscreen-based control method not only may be applied to MOBA games, but also may be applied to the design field. For example, a designer may position a colored part of a virtual target in the candidate effect range region by operating the auxiliary control region. In this case, the virtual target is an object that is to be edited or designed, for example, a cartoon character, clothes, or shoes.

In an embodiment, the touchscreen-based control method further includes: cancelling the first effect range when the first touch point is moved out of the auxiliary control region. In a conventional technology, a skill needs to be cast after an icon is dragged and cannot be cancelled. However, in this embodiment, movement of the first touch point is detected. When the first touch point is moved out of the auxiliary control region, obtaining of the first effect range according to the location of the first touch point and the mapping relationship between the location of the candidate effect range region and the location of the auxiliary control region is cancelled, so as to cancel the subsequent first operation. In this embodiment, the user may cancel the corresponding first operation by trying to move the first icon out of the auxiliary control region. This makes the operation more convenient.

Figure 6:
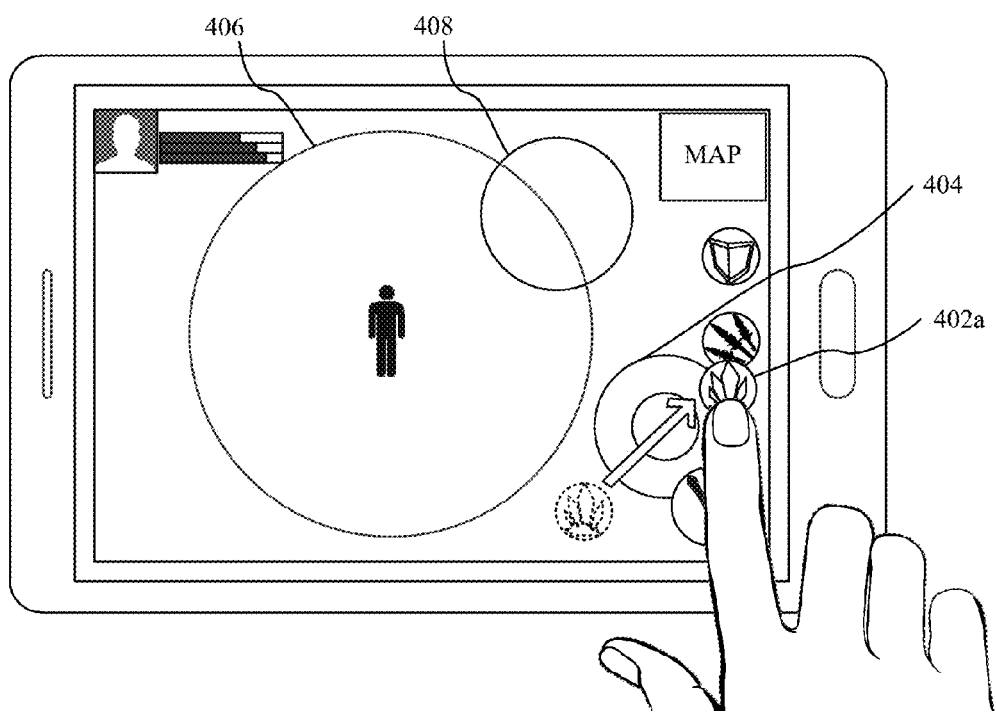
FIG. 6 shows a third interface of implementing a touchscreen-based control method on a terminal according to an embodiment.

For example, referring to FIG. 6, after moving a first icon 402a to an auxiliary control region 404, if the user wants to cancel a first operation corresponding to the first icon 402a, the user continues moving the first icon 402a to an edge of the auxiliary control region 404, where a first effect range 408 is shown in FIG. 6, and then continues moving the first icon 402a out of the auxiliary control region 404. In this case, the terminal 200 stops obtaining the location of the first effect range relative to the candidate effect range region 406, stops displaying the first effect range, and does not perform the first operation corresponding to the first icon 402a.

Figure 7:
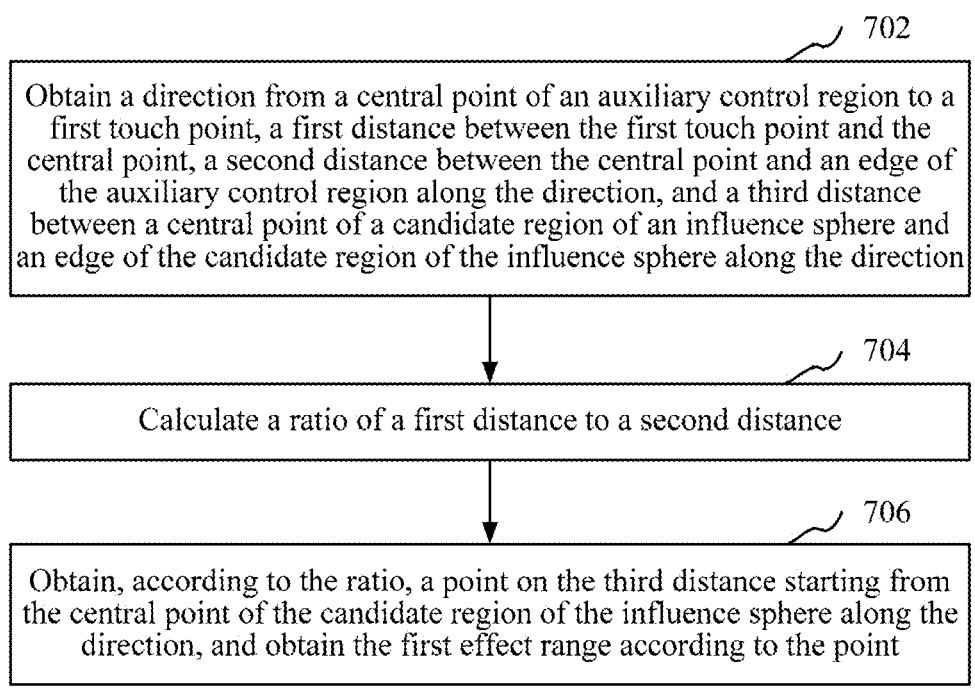
FIG. 7 is a schematic flowchart of a step of obtaining a first effect range according to a mapping relationship between a location of a candidate effect range region and a location of an auxiliary control region, and a location of a first touch point according to an embodiment.

As shown in FIG. 7, in an embodiment, the auxiliary control region and the candidate effect range region are geometrically similar; and step 306 of obtaining a first effect range according to a location of the first touch point, and a mapping relationship between a location of the candidate effect range region and a location of the auxiliary control region specifically includes the following steps:

Step 702: Obtain a direction from a central point of the auxiliary control region to the first touch point, a first distance between the first touch point and the central point, a second distance between the central point and an edge of the auxiliary control region along the direction, and a third distance between a central point of the candidate effect range region and an edge of the candidate effect range region along the direction.

Figure 8:
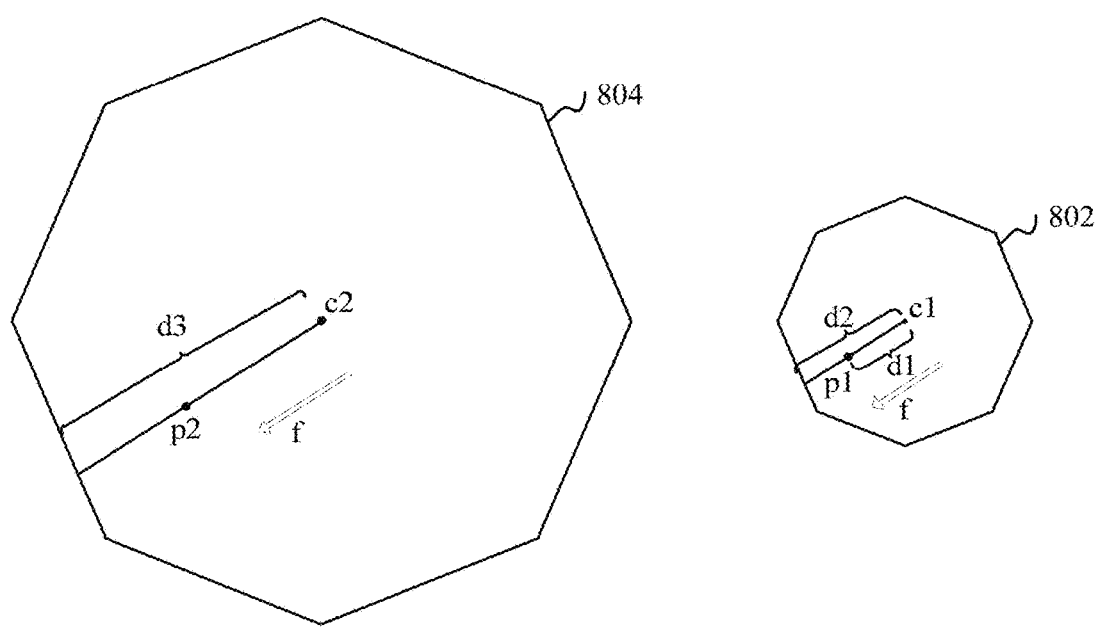
FIG. 8 is a schematic principle diagram of obtaining a representative location of a first effect range according to an embodiment.

For details, refer to FIG. 8. An auxiliary control region 802 and a candidate effect range region 804 are geometrically similar. A terminal 200 obtains a direction f of a first touch point p1 relative to a central point c1 of an auxiliary control region 802. The terminal 200 obtains that a first distance between the first touch point p1 and the central point c1 is d1. The terminal 200 obtains that a second distance between the central point c1 and an edge of the auxiliary control region 802 along the direction f is d2. The terminal 200 obtains that a third distance between a central point c2 of the candidate effect range region 804 and an edge of the candidate effect range region 804 along the direction f is d3. The direction f may be referred to as a first direction. The central point c1 of the auxiliary control region 802 may be a point of symmetry or a point of gravity of the auxiliary control region 802, or a point approximately at the center of the auxiliary control region 802.

Step 704: Calculate a ratio of the first distance to the second distance.

Specifically, it is calculated that the ratio of the first distance d1 to the second distance d2 is d1/d2.

Step 706: Obtain, according to the ratio, a point on the third distance starting from the central point of the candidate effect range region along the direction, and obtain the first effect range according to the obtained point.

Specifically, the point p2 is obtained at a d1/d2 location on the third distance d3 starting from the central point p2 of the candidate effect range region 804 along the direction f. The point p2 is used as a representative location of the first effect range. The first effect range is drawn by using the point p2 as the center, to obtain the first effect range.

In this embodiment, when the auxiliary control region and the candidate effect range region are geometrically similar, the auxiliary control region and the candidate effect range region may be any regular or irregular shapes and have very high compatibility.

Figure 9:
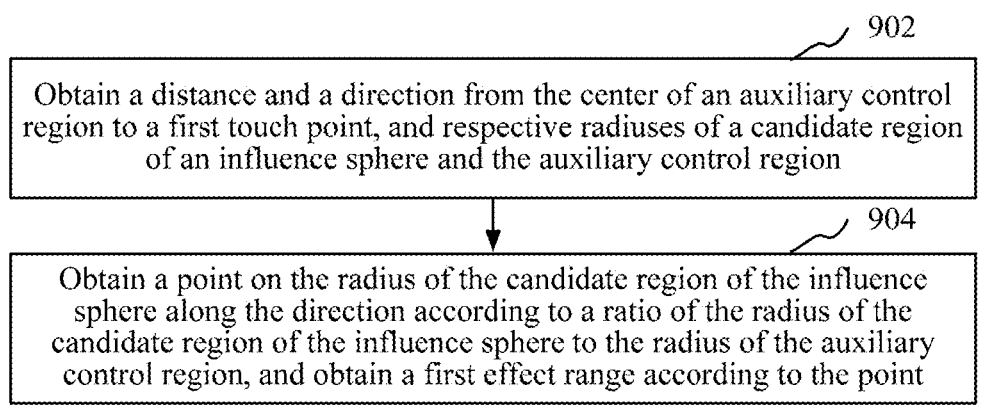
FIG. 9 is a schematic flowchart of a step of obtaining a first effect range according to a mapping relationship between a location of a candidate effect range region and a location of an auxiliary control region, and a location of a first touch point according to another embodiment.

As shown in FIG. 9, in an embodiment, an auxiliary control region and a candidate effect range region are both circles; and step 306 of obtaining a first effect range according to a location of the first touch point, and a mapping relationship between a location of the candidate effect range region and a location of the auxiliary control region specifically includes the following steps:

Step 902: Obtain a distance and a direction from the center of the auxiliary control region to the first touch point, and respective radiuses of the candidate effect range region and the auxiliary control region.

Figure 10:
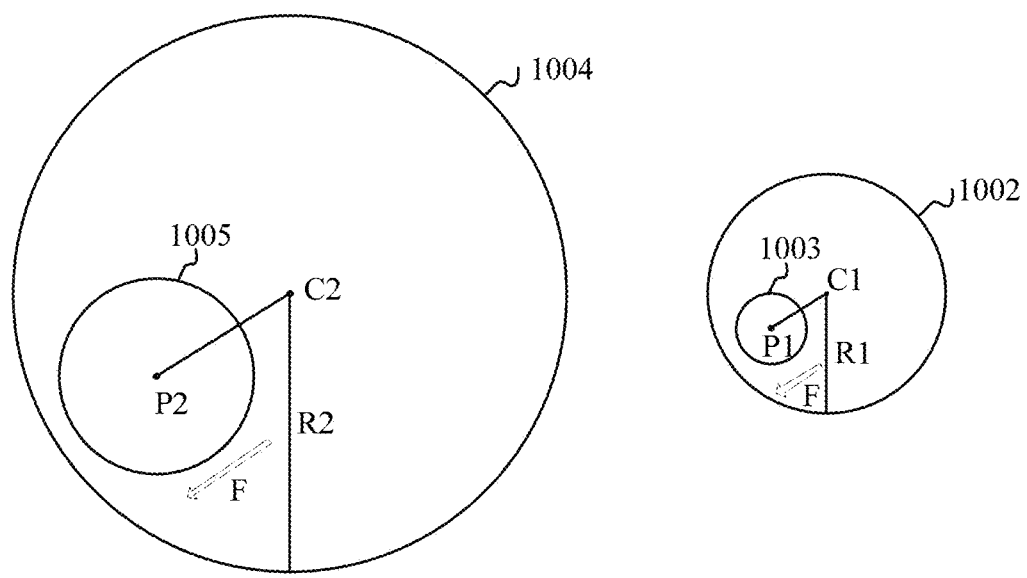
FIG. 10 is a schematic principle diagram of obtaining a representative location of a first effect range according to another embodiment.

Specifically, referring to FIG. 10, an auxiliary control region 1002 and a candidate effect range region 1004 are both circles, The center of the auxiliary control region 1002 is C1, and the radius is R1. The center of the candidate effect range region 1004 is C2, and the radius is R2. A first touch point is P1, a first icon is 1003, a first effect range is 1005, and a representative location of the first effect range 1005 is P2. A direction from the center of the auxiliary control region 1002 to the first touch point P1 is F, where the direction F may be referred to as a second direction.

Step 904: Obtain a point on the radius of the candidate effect range region along the direction according to a ratio of the radius of the candidate effect range region to the radius of the auxiliary control region, and obtain the first effect range according to the obtained point.

Specifically, the following formula is provided:

$$\frac{C2P2}{R2} = \frac{C1P1}{R1},$$

where C2P2 is a distance between the center C2 of the candidate effect range region 1004 and the representative location P2, C1P1 is a distance between the center C1 of the auxiliary control region 1002 and the first touch point P1, and directions of C2P2 and C1P1 are the same.

It may be obtained according to the foregoing formula that C2P2=C1P1*R2/R1. That is, the distance between the center C1 of the auxiliary control region 1002 and the first touch point P1 is multiplied by the ratio R2/R1 of the radius of the candidate effect range region 1004 to the radius of the auxiliary control region 1002, to obtain the point P2 on the radius of the candidate effect range region 1004 along the direction F to obtain a representative location of the first effect range.

In this embodiment, when the auxiliary control region and the candidate effect range region are both circles, the first effect range may be rapidly determined according to the radius ratio thereof. Therefore, calculation efficiency is high.

Figure 11:
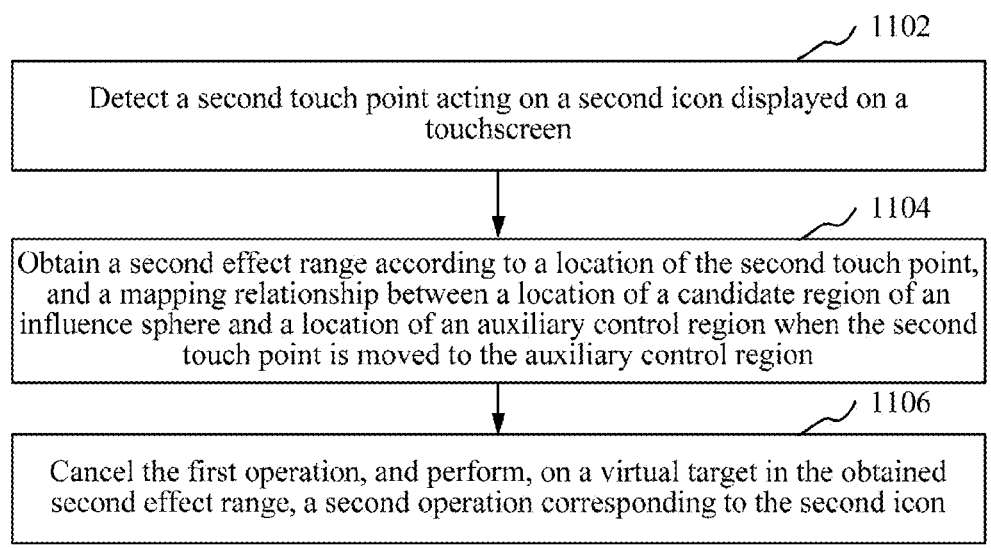
FIG. 11 is a schematic flowchart of a step of performing a second operation according to a second touch point according to an embodiment.

As shown in FIG. 11, in an embodiment, the touchscreen-based control method further includes a step of performing a second operation according to a second touch point. The method specifically includes the following steps:

Step 1102: Detect a second touch point acting on a second icon displayed on a touchscreen.

Specifically, a user may touch the touchscreen by using a touch subject such as a finger or a capacitive stylus. In this way, a terminal 200 can detect a touch point triggered by the touch subject on the touchscreen. If the terminal 200 detects that there is a touch point in a region where the touchscreen displays the second icon, the touch point is the second touch point acting on the second icon of displayed icons.

Step 1104: Obtain a second effect range according to a location of the second touch point, and a mapping relationship between a location of a candidate effect range region and a location of an auxiliary control region when the second touch point is moved into the auxiliary control region.

Specifically, the terminal 200 may detect movement of the second touch point, and when the second touch point is moved, control the second icon to move along a moving trace of the second touch point. For example, the second icon may be always drawn and refreshed by using the second touch point as a center. In this way, the second icon visually moves while a touch subject moves.

The location of the auxiliary control region has a mapping relationship with the location of the candidate effect range region. The location of the second touch point in the auxiliary control region may be mapped to a representative location of the second effect range in the candidate effect range region according to the mapping relationship, so as to determine the second effect range according to the representative location.

In an embodiment, if the auxiliary control region and the candidate effect range region are geometrically similar, the terminal 200 may determine the representative location of the second effect range according to the location of the second touch point relative to the auxiliary control region, and a ratio of the auxiliary control region to the candidate effect range region, so as to obtain the second effect range.

In an embodiment, if the auxiliary control region and the candidate effect range region are not geometrically similar, the terminal 200 may establish a nonlinear mapping relationship between a location in the auxiliary control region and a location in the candidate effect range region in advance, so that the terminal 200 may determine the second effect range according to the nonlinear mapping relationship and the location of the second touch point relative to the auxiliary control region.

Step 1106: Cancel a first operation, and perform, on a virtual target in the obtained second effect range, a second operation corresponding to the second icon.

Specifically, when detecting an operation determining event, the terminal 200 may cancel the first operation, and perform the second operation corresponding to the second icon in the obtained second effect range. In an embodiment, the operation determining event includes: The touch point disappears, and the touch point stays static within first preset duration, and second preset duration is reached since the touch point is detected.

Specifically, that the second touch point disappears is an event caused when a touch subject leaves a touch surface of the touchscreen. That the second touch point stays static within the first preset duration represents that the touch subject touches a same location of the touchscreen for a period longer than the first preset duration. That the second preset duration is reached since the second touch point is detected may prevent the user from performing determining within the second preset duration. If the second preset duration is reached, it indicates that the user performs determining. The first preset duration and the second preset duration may be set according to needs.

In an embodiment, the second operation includes at least one of: changing a game attribute value of the virtual target, adding a specified state to the virtual target, or restricting mobility of the virtual target.

When the terminal 200 detects the operation determining event, if the first operation is still being performed, the terminal 200 cancels the first operation, and performs the second operation corresponding to the second icon in the obtained second effect range. When the terminal 200 detects the operation determining event, if the first operation already ends, the terminal 200 directly performs the second operation corresponding to the second icon in the obtained second effect range. Before detecting the operation determining event, the terminal 200 does not interfere with execution of the first operation.

Figure 12:
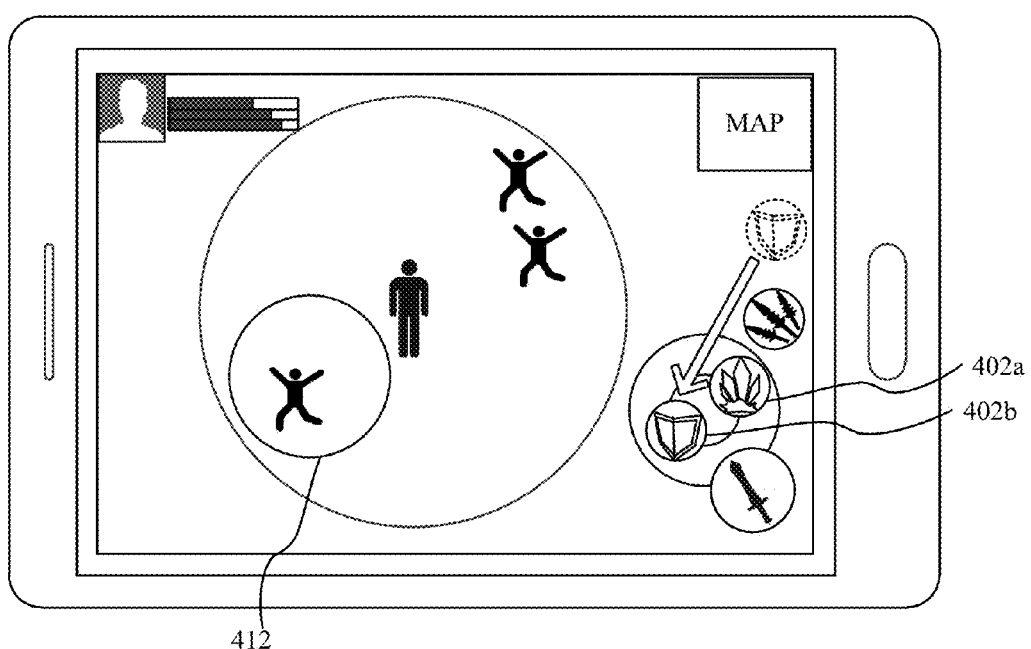
FIG. 12 shows a fourth interface of implementing a touchscreen-based control method on a terminal according to an embodiment.

For example, referring to FIG. 12, in a process of performing a first operation by a terminal 200, a first icon 402a stays at the location where the first operation is triggered. In this case, a user touches a second icon 402b on a touchscreen and drags the second icon 402b to an auxiliary operation region, and execution of the first operation is not interrupted in the drag process. The terminal 200 obtains a representative location of a second effect range 412. When the user stops touching the second icon 402b, the terminal 200 interrupts execution of the first operation, and the first icon 402a no longer stays in the auxiliary operation region and is reset to the original location of the first icon 402a. Moreover, the terminal 200 performs a second operation corresponding to the second icon 402b, and the second icon 402b stays at the location where the second operation is triggered.

In this embodiment, the first operation corresponding to the first icon may be cancelled by means of the second operation corresponding to the second icon, thereby improving operation controllability.

In an embodiment, before step 304, the method further includes: detecting movement of a first touch point; and when the first touch point is moved, performing step 304 and a subsequent step; or when the first touch point is static and an operation determining event is detected, obtaining a locked virtual target, determining a first effect range according to a location of the locked virtual target, and performing, on a virtual target in the corresponding first effect range, the first operation corresponding to the first icon.

Specifically, locking the virtual target refers to using the virtual target as an operation object. If the first touch point is moved, it indicates that a current user needs to determine the first effect range by using the auxiliary operation region. If the first touch point is static and the operation determining event is detected, it indicates that a current user needs to automatically determine the first effect range. In this case, the first effect range is determined according to the location of the locked virtual target and the first operation is triggered.

In an embodiment, a user may lock a virtual target by directly operating the virtual target, for example, directing taping the virtual target. In an embodiment, if the user does not lock a virtual target, the virtual target may be automatically locked according to importance priorities of virtual targets and/or distances between the virtual targets and a current user game character. For example, in MOBA games, a game character with a higher importance level may be preferably selected and locked. If there is no game character with a higher importance level, a game character with a lower importance level is selected and locked, and so on. For another example, a game character nearest to the current user game character may be preferably selected and locked.

In this embodiment, different manners for determining a first effect range are provided to a user by detecting whether a first touch point is moved, thereby providing different manners for triggering a first operation. These manners may be applied to various game scenarios, and have high compatibility and high operability.

Figure 13:
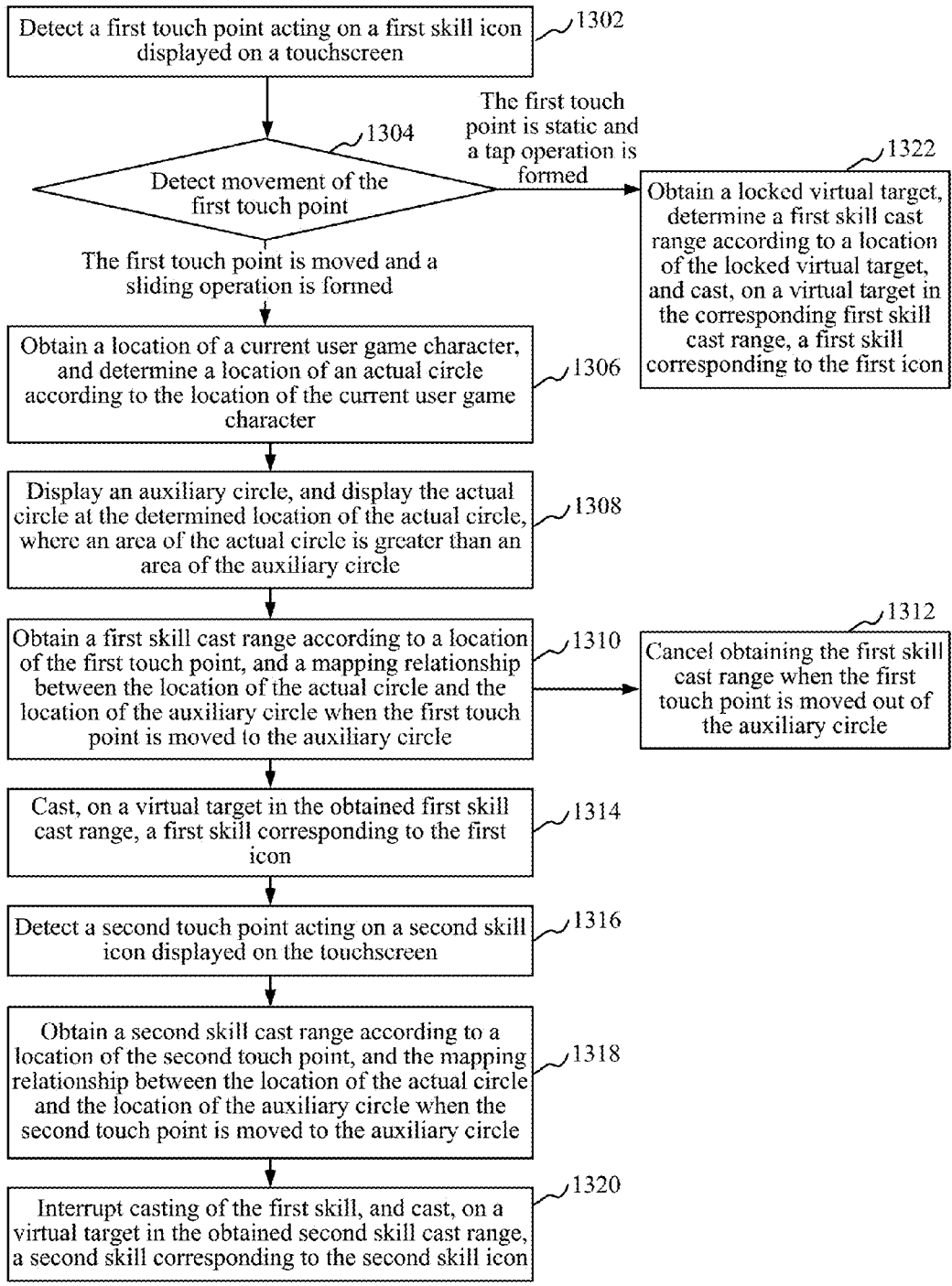
FIG. 13 is a schematic flowchart of a touchscreen-based control method according to an embodiment.

As shown in FIG. 13, in a specific embodiment, a touchscreen-based control method is provided. This embodiment is applied to MOBA games in mobile terminals. An icon is a skill icon. An auxiliary control region is an auxiliary circle. A candidate effect range region is an actual circle. The auxiliary circle and the actual circle are both circular. An effect range is a skill cast range. An area of the actual circle is greater than an area of the auxiliary circle. The actual circle herein refers to a circle that is actually displayed on a game map. The method specifically includes the following steps:

Step 1302: Detect a first touch point acting on a first skill icon displayed on a touchscreen.

Step 1304: Detect movement of the first touch point; and when the first touch point is moved and a sliding operation is formed, perform step 1306; or when the first touch point is static and a tap operation is formed, perform step 1322.

Step 1306: Obtain a location of a current user game character, and determine a location of an actual circle according to the location of the current user game character.

Step 1308: Display an auxiliary circle, and display the actual circle at the determined location of the actual circle, where an area of the actual circle is greater than an area of the auxiliary circle.

Step 1310: Obtain a first skill cast range according to a location of the first touch point, and a mapping relationship between the location of the actual circle and the location of the auxiliary circle when the first touch point is moved to the auxiliary circle.

Step 1312: Cancel obtaining the first skill cast range when the first touch point is moved out of the auxiliary circle.

Step 1314: Cast, on a virtual target in the obtained first skill cast range, a first skill corresponding to the first icon.

Step 1316: Detect a second touch point acting on a second skill icon displayed on the touchscreen.

Step 1318: Obtain a second skill cast range according to a location of the second touch point, and the mapping relationship between the location of the actual circle and the location of the auxiliary circle when the second touch point is moved to the auxiliary circle.

Step 1320: Interrupt casting of the first skill, and cast, on a virtual target in the obtained second skill cast range, a second skill corresponding to the second skill icon. It may be understood that step 1316 to step 1320 may be omitted.

Step 1322: Obtain a locked virtual target, determine a first skill cast range according to a location of the locked virtual target, and cast, on a virtual target in the corresponding first skill cast range, a first skill corresponding to the first icon. When a virtual target is locked, the virtual target may be selected according to an importance level or according to a distance between the virtual target and a current user game character.

In this embodiment, a user taps a first skill icon of icons displayed on a touchscreen, the touchscreen displays an auxiliary circle and an actual circle, and a location of the auxiliary circle has a mapping relationship with a location of the actual circle. In this way, when tapping the first skill icon and dragging the first skill icon to the auxiliary circle, the user may adjust a location of a first skill cast range in the actual circle with a larger area by controlling a location of a first touch point in the auxiliary circle with a smaller area. In this way, the user does not need to perform a drag operation in a large region, thereby improving operation convenience, and a first effect range can be accurately positioned.

A manner used by the user for determining the first skill cast range may be determined by detecting whether the first touch point is moved, thereby providing multiple control manners for the user. When the user taps the first skill icon but does not move it, the user may rapidly obtain a location of a locked virtual target, so as to determine the first skill cast range, and further to cast a first skill on the virtual target in the first skill cast range, thereby rapidly casting the skill. In this way, a skill cast manner characterized by accurate and efficient positioning can be provided for a game master hand, and a simple and direct skill cast manner can also be provided for a game green hand.

In addition, when the user moves the first skill icon out of the auxiliary circle, casting of the first skill can be cancelled. Casting of a skill can be rapidly cancelled when the user selects an incorrect skill or suddenly changes a strategy of skill casting, so as to continue another operation, for example, choose to cast another skill or control a current user game character to move.

A principle of the touchscreen-based control method is described below by using a specific application scenario. This application scenario is applied to MOBA games in mobile terminals. An icon is a skill icon. An auxiliary control region is an auxiliary circle. A candidate effect range region is an actual circle. The auxiliary circle and the actual circle are both circular. An effect range is a skill cast range. An area of the actual circle is greater than an area of the auxiliary circle. The following steps are specifically included:

When a user taps a first skill icon displayed on a touchscreen, the touchscreen displays the actual circle by using a current user character as the center, and displays the auxiliary circle at an edge of the touchscreen. Specifically, referring to FIG. 14, the user taps a first skill icon 1401. A first skill corresponding to the first skill icon 1401 is freezing magic. A cast effect is that damage of a constant value is caused to a virtual target in the first skill cast range and a moving speed of the virtual target is decreased. In this case, the touchscreen displays the actual circle by using a current user game character 1402 as the center, and displays the auxiliary circle at the right side of the touchscreen. A skill icon 1403 in the figure is the skill icon corresponding to a skill previously cast. The previously cast skill may be rapidly cast after the skill icon is tapped.

Figure 14:
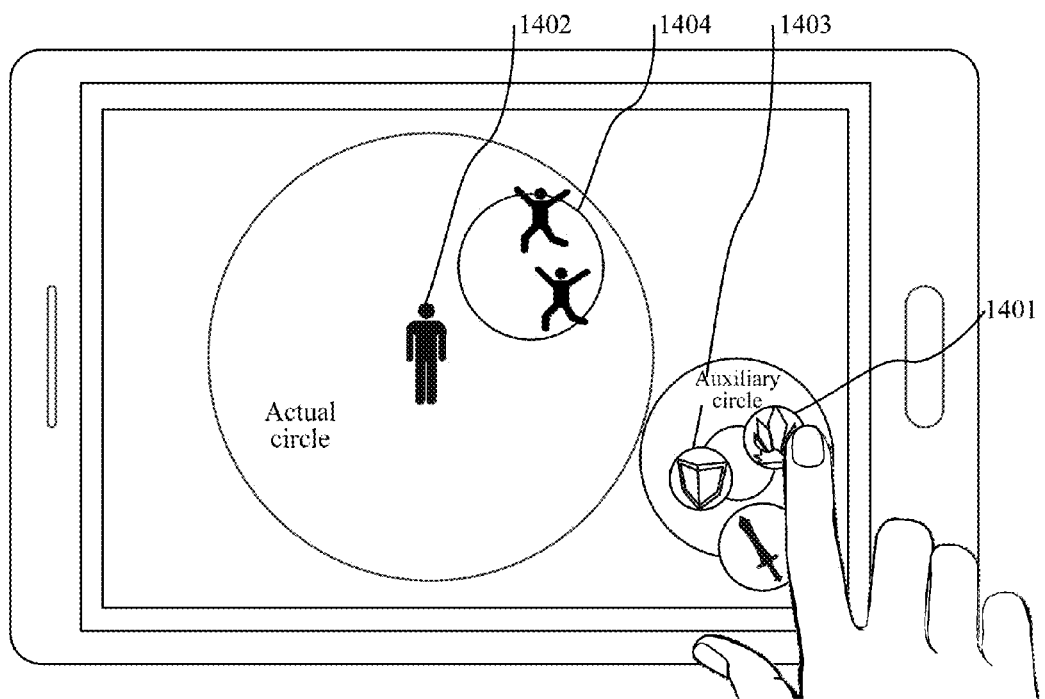
FIG. 14 shows a fifth interface of implementing a touchscreen-based control method on a terminal according to an embodiment.
Figure 15:
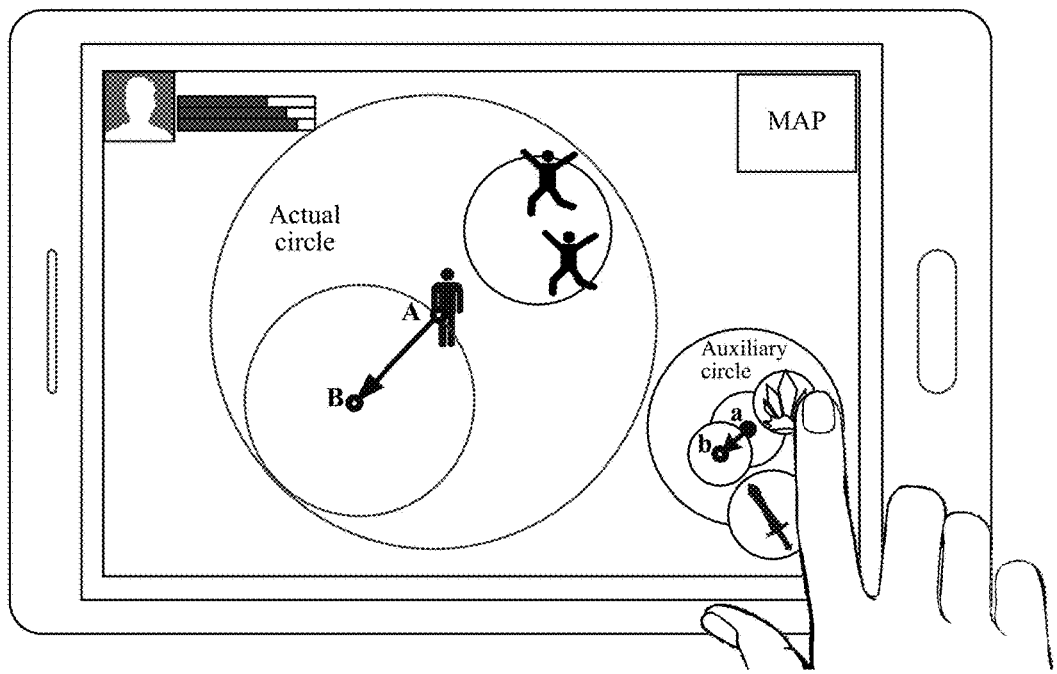
FIG. 15 shows a sixth interface of implementing a touchscreen-based control method on a terminal according to an embodiment.

The user drags the first skill icon to the auxiliary circle. A mobile terminal obtains a first skill cast range according to a location of the first skill icon in the auxiliary circle and a mapping relationship between a location of the actual circle and a location of the auxiliary circle. Referring to FIG. 14, the user moves the first skill icon 1401 to the auxiliary circle, and the mobile terminal calculates a location of a representative point of the first skill cast range, to form the first skill cast range 1404 by using the representative point as a center and according to a constant radius of the first skill cast range. Referring to FIG. 15, specifically, when the representative point B is calculated, assuming that the center of the actual circle is A, a radius of the actual circle is r, the center of the auxiliary circle is a, a radius of the auxiliary circle is R, and the center of the first skill icon is b, ab=AB*R/r, and directions of ab and AB are the same.

Figure 16:
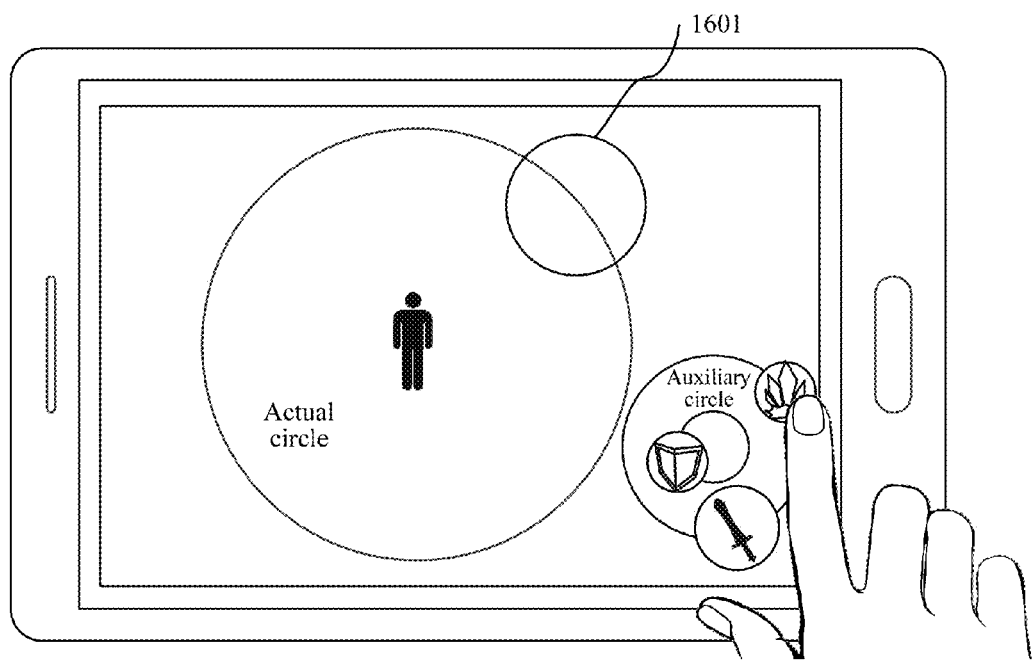
FIG. 16 shows a seventh interface of implementing a touchscreen-based control method on a terminal according to an embodiment.

A user drags a first skill icon out of an auxiliary circle, and cancels obtaining a first skill cast range. Specifically, when the user drags the first skill icon to an edge of the auxiliary circle, the first skill cast range 1601 shown in FIG. 16 is displayed. Obtaining of the first skill cast range is cancelled if the user continues performing dragging, to cancel casting a first skill.

After the user drags the first skill icon to the auxiliary circle and ends touching, a mobile terminal casts, on a virtual target in the obtained first skill cast range, a first skill corresponding to the first icon. Specifically, referring to FIG. 14, the first skill corresponding to the first skill icon 1401 is freezing magic. In this case, the mobile terminal casts the freezing magic on the virtual target in the obtained first skill cast range. This hurts each virtual target, and decreases moving speeds of these virtual targets.

Figure 17:
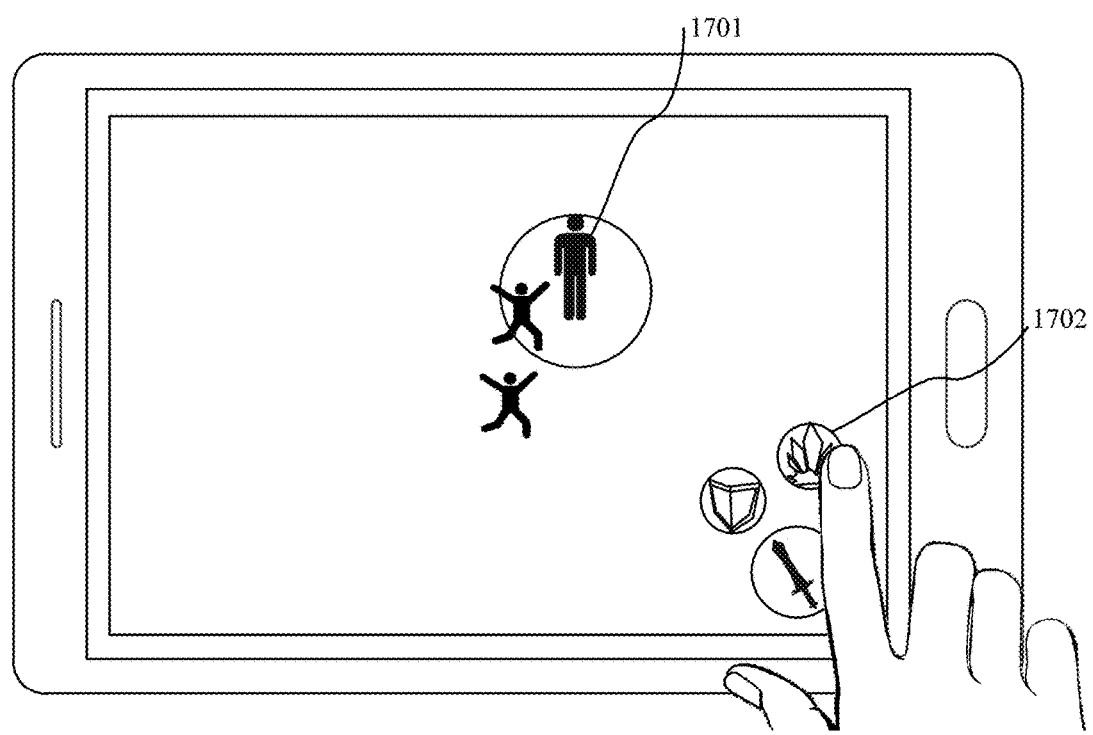
FIG. 17 shows an eighth interface of implementing a touchscreen-based control method on a terminal according to an embodiment.

If the user directly taps the first skill icon and does not move the first skill icon, the mobile terminal obtains a locked virtual target, determines the first skill cast range according to a location of the locked virtual target, and directly casts the first skill on a virtual target in the first skill cast range. If the virtual target is not within an attack range of a current user game character, the mobile terminal controls the current user game character to move, so that the virtual target is within the attack range of the current user game character, and then determines the first skill cast range according to the location of the locked virtual target and casts the first skill. Referring to FIG. 17, if the virtual target is locked by tapping an enemy virtual target, which is specifically a hero 1701 whose name is Hu Wang in FIG. 17, the user directly taps a first skill icon 1702. The auxiliary circle and the actual circle are not displayed. Instead, the first skill cast range is directly formed according to a location of the hero 1701. The first skill is directly cast in the first skill cast range, to hurt the hero 1701. Multiple control manners are provided for the user herein, a skill cast manner characterized by accurate and efficient positioning can be provided for a game master hand, and a simple and direct skill cast manner can also be provided for a game green hand.

Figure 18:
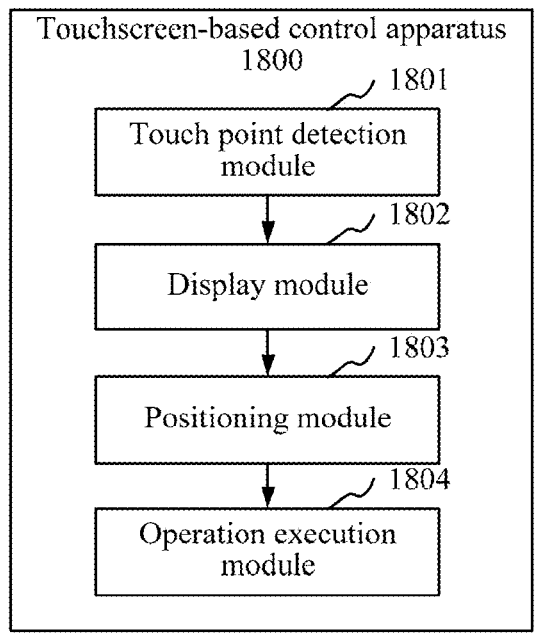
FIG. 18 is a structural block diagram of a touchscreen-based control apparatus according to an embodiment.

As shown in FIG. 18, in an embodiment, a touchscreen-based control apparatus 1800 is provided, including: a touch point detection module 1801, a display module 1802, a positioning module 1803, and an operation execution module 1804.

The touch point detection module 1801 is configured to detect a first touch point acting on a first icon displayed on a touchscreen.

Specifically, an icon is used for intuitively displaying an operation that can be implemented by this icon. Each icon corresponds to one operation. The touchscreen displays at least one icon. Shapes and sizes of icons may be the same or may be different. Icons may be distinguished from each other by using at least one of: texts, symbols, patterns, or colors in the icons, or a combination thereof.

The icons displayed on the touchscreen include at least the first icon. "First" in the first icon, the first touch point, or the like is used for identifying the icon or the touch point, and is not used for limiting a quantity. Specifically, a user may touch the touchscreen by using a touch subject such as a finger or a capacitive stylus. In this way, the touch point detection module 1801 is configured to detect a touch point triggered by the touch subject on the touchscreen. If the touch point detection module 1801 detects that there is a touch point in a region where the touchscreen displays the first icon, the touch point is the first touch point acting on the first icon.

The display module 1802 is configured to display an auxiliary control region and a candidate effect range region, an area of the candidate effect range region being greater than an area of the auxiliary control region.

Specifically, the auxiliary control region is a region in which a user performs an operation, and the candidate effect range region is a selection region used for determining a first effect range of a first operation corresponding to the first icon. The auxiliary control region and the candidate effect range region may intersect with each other or may be separated from each other. When the candidate effect range region is drawn for display, the candidate effect range region may be deformed according to a requirement on a stereoscopic display effect, to achieve an effect that the candidate effect range region may have a corresponding shape under the stereoscopic effect. For example, a circular candidate effect range region is elliptic when being drawn, but it is visually circular.

The area of the candidate effect range region is greater than the area of the auxiliary control region. This may ensure that a user operates in the smaller auxiliary control region during operation, and does not need to move or operate in a large region of the entire touchscreen.

The auxiliary control region and the candidate effect range region may be geometrically similar. For example, both are circles, ellipses, polygons, or irregular figures whose edges form same shapes. Shapes of the auxiliary control region and the candidate effect range region may be different. For example, the auxiliary control region may be a circle, while the corresponding candidate effect range region may be a rectangle; or the auxiliary control region may be a circle, while the corresponding candidate effect range region may be a polygon, as long as a location in the auxiliary control region can be mapped to a corresponding location in the candidate effect range region.

In an embodiment, the auxiliary control region and the candidate effect range region are both centrosymmetric figures or axisymmetric figures. If a figure that is obtained after an original figure is rotated by 180 degrees around the central point of the original figure overlaps the original figure, the original figure is referred to as a centrosymmetric figure, and the central point is referred to as a center of symmetry. The centrosymmetric figure may be, for example, a circle or a polygon with an even quantity of sides.

In an embodiment, the auxiliary control region and the candidate effect range region are both axisymmetric figures. After an axisymmetric figure is folded along the axis of symmetry thereof, two parts separated by the axis of symmetry of the axisymmetric figure completely overlap each other. The axisymmetric figure may be, for example, a circle, a polygon, or an ellipse.

In an embodiment, the location of the candidate effect range region is determined according to a location of a current user game character. The current user game character is a game character controlled by a current user. The display module 1802 may be configured to draw the candidate effect range region by using the location of the current user game character as a central point. The display module 1802 may be further configured to draw the candidate effect range region by using the location of the current user game character as a starting point.

In an embodiment, the display module 1802 may be configured to display, in the auxiliary control region, a figure that is geometrically similar to the auxiliary control region and whose area is less than the area of the auxiliary control region, for example, 405 in FIG. 4. The area of the figure is positively correlated to the first effect range of the first icon. In this embodiment, a size of the first effect range of the first operation corresponding to the first icon may be intuitively displayed by using a figure in the auxiliary control region, so that the user adjusts the location of the first effect range during operation according to the size of the first effect range.

The positioning module 1803 is configured to obtain a first effect range according to a location of the first touch point, and a mapping relationship between a location of the candidate effect range region and a location of the auxiliary control region when the first touch point is moved into the auxiliary control region.

Specifically, the positioning module 1803 may be configured to: detect movement of the first touch point, and when the first touch point is moved, control the first icon to move along a moving trace of the first touch point. For example, the first icon may be always drawn and refreshed by using the first touch point as a center. In this way, the first icon visually moves while a touch subject moves.

The location of the auxiliary control region has a mapping relationship with the location of the candidate effect range region. The location of the first touch point in the auxiliary control region may be mapped to the location of the first effect range in the candidate effect range region according to the mapping relationship. The first effect range may be a circle, a sector, a straight line, or any irregular shape.

In an embodiment, if the auxiliary control region and the candidate effect range region are geometrically similar, the positioning module 1803 may be configured to determine the location of the first effect range relative to the candidate effect range region according to the location of the first touch point relative to the auxiliary control region, and a ratio of the auxiliary control region to the candidate effect range region.

In an embodiment, if the auxiliary control region and the candidate effect range region are not geometrically similar, the positioning module 1803 may be configured to determine the location of the first effect range relative to the candidate effect range region according to a nonlinear mapping relationship, which is established in advance, between a location in the auxiliary control region and a location in the candidate effect range region, and the location of the first touch point relative to the auxiliary control region.

The operation execution module 1804 is configured to perform, on a virtual target in the obtained first effect range, a first operation corresponding to the first icon.

Specifically, when detecting an operation determining event, the operation execution module 1804 may be configured to perform, on the virtual target in the obtained first effect range, the first operation corresponding to the first icon. In an embodiment, the operation determining event includes: The touch point disappears, and the touch point stays static within first preset duration, and second preset duration is reached since the touch point is detected. The touch point herein includes the first touch point and a second touch point. That the first touch point disappears is an event caused when a touch subject leaves a touch surface of the touchscreen. That the first touch point stays static within the first preset duration represents that the touch subject touches a same location of the touchscreen for a period longer than the first preset duration. That the second preset duration is reached since the first touch point is detected may prevent the user from performing determining within the second preset duration. If the second preset duration is reached, it indicates that the user performs determining. The first preset duration and the second preset duration may be set according to needs.

The virtual target is a digital operational object. In an embodiment, the virtual target includes a player character and a non-player character (NPC). The player character refers to a game character controlled by a player. In MOBA games, the player character may be referred to as a hero. Each hero has a respective name and has skills with various effects. The player character has a growth feature. Various player-controlled game characters change due to a game progress. The non-player character is a game character automatically controlled in the MOBA games. Various game attributes of the non-player character are usually constant or the growth feature is relatively weak. The non-player character may be a cavalry, an infantry, an archer, a mage, an archer tower, a turret, a magic tower, a demolisher, a mortar, a beast soldier, or the like.

In an embodiment, the first operation includes at least one of: changing a game attribute value of the virtual target, adding a specified state to the virtual target, or restricting mobility of the virtual target. The changing herein may be increasing or decreasing. Changing the game attribute value of the virtual target includes: changing a physical strength value, changing a magic value, changing an agility attribute value, changing a strength attribute value, and changing an intelligence attribute value. A specified state includes: an unbeatable state, a magic attack-immune status, a physical attack-immune status, an ethereal status, a poisoned status, a decelerating status, an accelerating status, and the like. Restriction of mobility includes: freeze of the virtual target caused by a freezing skill, or daze of the virtual target caused by a daze skill.

According to the touchscreen-based control apparatus 1800, a touchscreen displays icons. A user taps a first icon of the icons displayed on the touchscreen. The touchscreen displays an auxiliary control region having a smaller area and a candidate effect range region having a larger area. A location of the auxiliary control region has a mapping relationship with a location of the candidate effect range region. In this way, when the user taps the first icon and drags the first icon to the auxiliary control region, the user may adjust a location of a first effect range relative to the candidate effect range region in a large region by adjusting a location of a first touch point relative to the auxiliary control region in a small region, and further perform, on a virtual target in the first effect range, a first operation corresponding to the first icon. The user does not need to perform a drag operation in a large region, thereby improving operation convenience, and the first effect range can be accurately positioned.

Figure 19:
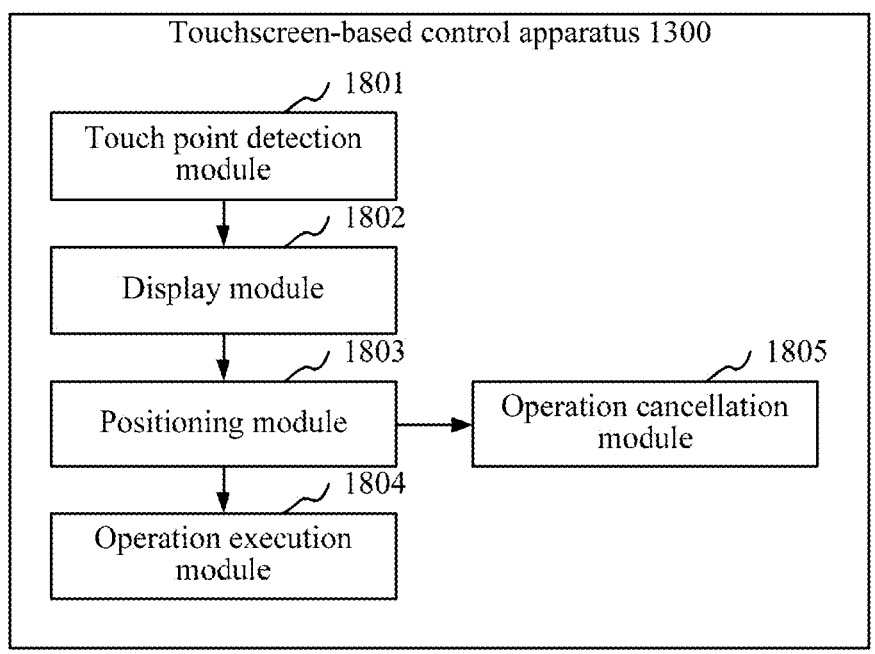
FIG. 19 is a structural block diagram of a touchscreen-based control apparatus according to another embodiment.

As shown in FIG. 19, in an embodiment, the touchscreen-based control apparatus 1800 further includes an operation cancellation module 1805, configured to cancel obtaining the first effect range when the first touch point is moved out of the auxiliary control region. In a conventional technology, a skill needs to be cast after an icon is dragged and cannot be cancelled. However, in this embodiment, movement of the first touch point is detected. When the first touch point is moved out of the auxiliary control region, obtaining of the first effect range according to the location of the first touch point and the mapping relationship between the location of the candidate effect range region and the location of the auxiliary control region is cancelled, so as to cancel the subsequent first operation. In this embodiment, the user may cancel the corresponding first operation by trying to move the first icon out of the auxiliary control region. This makes the operation more convenient.

Figure 20:
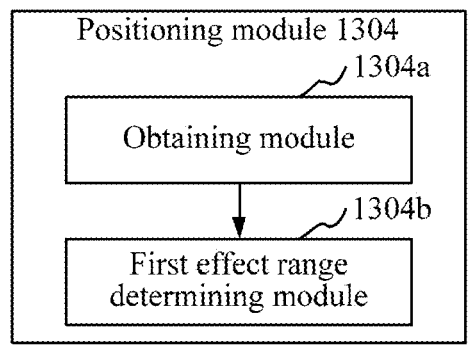
FIG. 20 is a structural block diagram of a positioning module according to an embodiment.

As shown in FIG. 20, in an embodiment, the auxiliary control region and the candidate effect range region are geometrically similar. The positioning module 1803 includes an obtaining module 1803a and a first effect range determining module 1803b.

The obtaining module 1803a is configured to obtain a direction from a central point of the auxiliary control region to the first touch point, a first distance between the first touch point and the central point, a second distance between the central point and an edge of the auxiliary control region along the direction, and a third distance between a central point of the candidate effect range region and an edge of the candidate effect range region along the direction.

The first effect range determining module 1803b is configured to: calculate a ratio of the first distance to the second distance; obtain, according to the ratio, a point on the third distance starting from the central point of the candidate effect range region along the direction, and obtain the first effect range according to the obtained point.

In this embodiment, when the auxiliary control region and the candidate effect range region are geometrically similar, the auxiliary control region and the candidate effect range region may be any regular or irregular shapes and have very high compatibility.

In an embodiment, the positioning module 1803 includes an obtaining module 1803a and a first effect range determining module 1803b.

The obtaining module 1803a is configured to obtain a distance and a direction from the circle center of the auxiliary control region to the first touch point, and respective radiuses of the candidate effect range region and the auxiliary control region.

The first effect range determining module 1803b is configured to: obtain a point on the radius of the candidate effect range region along the direction according to a ratio of the radius of the candidate effect range region to the radius of the auxiliary control region, and obtain the first effect range according to the obtained point.

In this embodiment, when the auxiliary control region and the candidate effect range region are both circles, the first effect range may be rapidly determined according to the radius ratio thereof. Therefore, calculation efficiency is high.

In an embodiment, the touch point detection module 1801 is further configured to detect a second touch point acting on a second icon displayed on a touchscreen.

Specifically, the touch point detection module 1801 may be configured to: detect movement of the second touch point, and when the second touch point is moved, control the second icon to move along a moving trace of the second touch point. For example, the second icon may be always drawn and refreshed by using the second touch point as a center. In this way, the second icon visually moves while a touch subject moves.

The positioning module 1803 is further configured to obtain a second effect range according to a location of the second touch point, and a mapping relationship between a location of the candidate effect range region and a location of the auxiliary control region when the second touch point is moved into the auxiliary control region.

The location of the auxiliary control region has a mapping relationship with the location of the candidate effect range region. The location of the second touch point in the auxiliary control region may be mapped to a representative location of the second effect range in the candidate effect range region according to the mapping relationship, so as to determine the second effect range according to the representative location.

In an embodiment, if the auxiliary control region and the candidate effect range region are geometrically similar, the positioning module 1803 may be configured to determine the representative location of the second effect range according to the location of the second touch point relative to the auxiliary control region, and a ratio of the auxiliary control region to the candidate effect range region, so as to obtain the second effect range.

In an embodiment, if the auxiliary control region and the candidate effect range region are not geometrically similar, the positioning module 1803 may be configured to determine the second effect range according to a nonlinear mapping relationship between a location in the auxiliary control region and a location of the candidate effect range region, and the location of the second touch point relative to the auxiliary control region.

The operation execution module 1804 is further configured to: cancel the first operation, and perform, on a virtual target in the obtained second effect range, a second operation corresponding to the second icon.

Specifically, when detecting an operation determining event, the operation execution module 1804 may be configured to cancel the first operation, and perform the second operation corresponding to the second icon in the obtained second effect range. In an embodiment, the operation determining event includes: The touch point disappears, and the touch point stays static within first preset duration, and second preset duration is reached since the touch point is detected.

Specifically, that the second touch point disappears is an event caused when a touch subject leaves a touch surface of the touchscreen. That the second touch point stays static within the first preset duration represents that the touch subject touches a same location of the touchscreen for a period longer than the first preset duration. That the second preset duration is reached since the second touch point is detected may prevent the user from performing determining within the second preset duration. If the second preset duration is reached, it indicates that the user performs determining. The first preset duration and the second preset duration may be set according to needs.

In an embodiment, the second operation includes at least one of: changing a game attribute value of the virtual target, adding a specified state to the virtual target, or restricting mobility of the virtual target.

The operation execution module 1804 may be configured to: when detecting the operation determining event, if the first operation is still being performed, cancel the first operation, and perform the second operation corresponding to the second icon in the obtained second effect range. The operation execution module 1804 may be configured to: when detecting the operation determining event, if the first operation already ends, directly perform the second operation corresponding to the second icon in the obtained second effect range. Before detecting the operation determining event, the terminal 200 does not interfere with execution of the first operation.

In this embodiment, the first operation corresponding to the first icon may be cancelled by means of the second operation corresponding to the second icon, thereby improving operation controllability.

Figure 21:
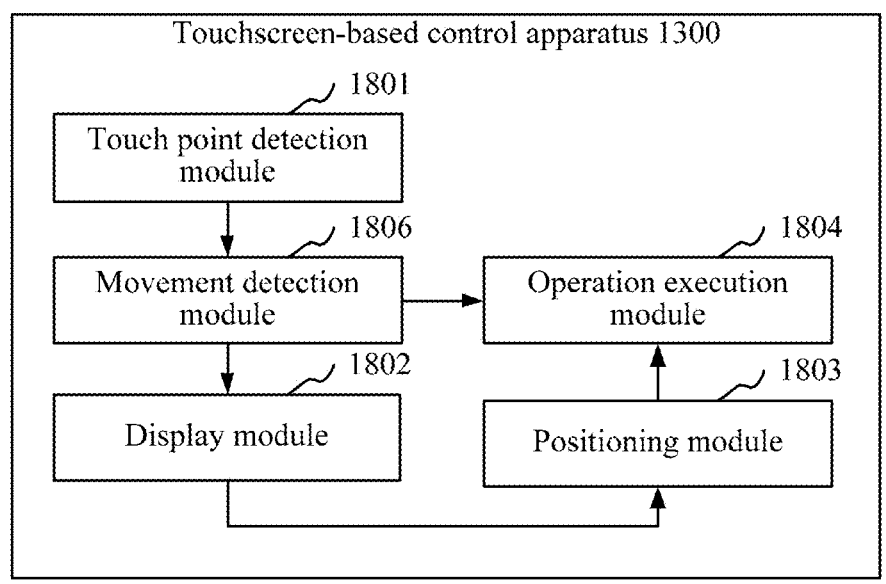
FIG. 21 is a structural block diagram of a touchscreen-based control apparatus according to still another embodiment.

As shown in FIG. 21, in an embodiment, the touchscreen-based control apparatus 1800 further includes: a movement detection module 1806, configured to detect movement of a first touch point.

The display module 1802 is further configured to: when the first touch point is moved, display an auxiliary control region and a candidate effect range region.

The operation execution module 1804 is further configured to: when the first touch point is static and an operation determining event is detected, obtain a locked virtual target, determine a first effect range according to a location of the locked virtual target, and perform, on a virtual target in the corresponding first effect range, a first operation corresponding to the first icon.

Specifically, locking the virtual target refers to using the virtual target as an operation object. If the first touch point is moved, it indicates that a current user needs to determine the first effect range by using the auxiliary operation region. If the first touch point is static and the operation determining event is detected, it indicates that a current user needs to automatically determine the first effect range. In this case, the first effect range is determined according to the location of the locked virtual target and the first operation is triggered.

In an embodiment, a user may lock a virtual target by directly operating the virtual target, for example, directing taping the virtual target. In an embodiment, if the user does not lock a virtual target, the virtual target may be automatically locked according to importance priorities of virtual targets and/or distances between the virtual targets and a current user game character. For example, in MOBA games, a game character with a higher importance level may be preferably selected and locked. If there is no game character with a higher importance level, a game character with a lower importance level is selected and locked, and so on. For another example, a game character nearest to the current user game character may be preferably selected and locked.

In this embodiment, different manners for determining a first effect range are provided to a user by detecting whether a first touch point is moved, thereby providing different manners for triggering a first operation. These manners may be applied to various game scenarios, and have high compatibility and high operability.

In an embodiment, the display module 1802 is further configured to display a candidate range region determined according to a location of the current user game character.

In an embodiment, the touch point detection module 1801 is configured to detect the first touch point acting on the first skill icon displayed on the touchscreen.

The movement detection module 1806 is configured to detect movement of the first touch point.

The display module 1802 is configured to: when the first touch point is moved and a sliding operation is formed, obtain the location of the current user game character, determine a location of an actual circle according to the location of the current user game character; display an auxiliary circle, and display the actual circle at the determined location of the actual circle, where an area of the actual circle is greater than an area of the auxiliary circle.

The positioning module 1803 is configured to obtain a first skill cast range according to a location of the first touch point, and a mapping relationship between the location of the actual circle and the location of the auxiliary circle when the first touch point is moved to the auxiliary circle.

The operation execution module 1804 is configured to cast, on a virtual target in the obtained first skill cast range, a first skill corresponding to the first icon.

The operation cancellation module 1805 is further configured to cancel obtaining the first skill cast range when the first touch point is moved out of the auxiliary circle.

The operation execution module 1804 is further configured to: when the first touch point is static and a tap operation is formed, obtain the locked virtual target, determine the first skill cast range according to the location of the locked virtual target, and cast, on the virtual target in the corresponding first skill cast range, the first skill corresponding to the first icon. When a virtual target is locked, the virtual target may be selected according to an importance level or according to a distance between the virtual target and a current user game character.

In an embodiment, the touch point detection module 1801 is further configured to detect a second touch point acting on a second skill icon displayed on the touchscreen.

The positioning module 1803 is further configured to obtain a second skill cast range according to a location of the second touch point, and a mapping relationship between the location of the actual circle and the location of the auxiliary circle when the second touch point is moved to the auxiliary circle.

The operation execution module 1804 is further configured to: interrupt casting of the first skill, and cast, on a virtual target in the obtained second skill cast range, a second skill corresponding to the second skill icon.

In this embodiment, a user taps a first skill icon of icons displayed on a touchscreen, the touchscreen displays an auxiliary circle and an actual circle, and a location of the auxiliary circle has a mapping relationship with a location of the actual circle. In this way, when tapping the first skill icon and dragging the first skill icon to the auxiliary circle, the user may adjust a location of a first skill cast range in the actual circle with a larger area by controlling a location of a first touch point in the auxiliary circle with a smaller area. In this way, the user does not need to perform a drag operation in a large region, thereby improving operation convenience, and a first effect range can be accurately positioned.

A manner used by the user for determining the first skill cast range may be determined by detecting whether the first touch point is moved, thereby providing multiple control manners for the user. When the user taps the first skill icon but does not move it, the user may rapidly obtain a location of a locked virtual target, so as to determine the first skill cast range, and further to cast a first skill on the virtual target in the first skill cast range, thereby rapidly casting the skill. In this way, a skill cast manner characterized by accurate and efficient positioning can be provided for a game master hand, and a simple and direct skill cast manner can also be provided for a game green hand.

In addition, when the user moves the first skill icon out of the auxiliary circle, casting of the first skill can be cancelled. Casting of a skill can be rapidly cancelled when the user selects an incorrect skill or suddenly changes a strategy of skill casting, so as to continue another operation, for example, choose to cast another skill or control a current user game character to move.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a non-volatile storage medium such as a magnetic disk, an optical disc, or a read-only memory (ROM), or a random access memory (RAM).

Technical features of the foregoing embodiments may be combined. For brevity of description, not all possible combinations of the technical features in the foregoing embodiments are described. However, these combinations shall fall within the scope recorded in this specification as long as the combinations have no conflict.

The foregoing embodiments are merely some embodiments of the present invention, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements belong to the protection scope of the present disclosure. Therefore, the protection scope of the present disclosure shall be subject to the protection scope of the appended claims.

What is claimed is:

1. A touchscreen-based control method for improving user experience of online gaming, the method performed at a terminal having one or more processors, memory for storing programs, and a touchscreen display, the method comprising:
   detecting, by the terminal, a first user touch acting on a first icon displayed on the touchscreen display, the first icon corresponding to a first operation of an online game;
   in response to detecting the first user touch:
      displaying, by the terminal, an auxiliary control region and a candidate effect range region on the touchscreen display, wherein (1) the auxiliary control region is a first predetermined area of the touchscreen display, (2) the candidate effect range region is a second predetermined area of the touchscreen display, (3) the candidate effect range region occupies a larger area of the touchscreen display than the auxiliary control region and (4) the distance between the candidate effect range and the first icon is greater than the distance between the auxiliary control region and the first icon; and
      establishing, by the terminal, a mapping relationship between a location of the candidate effect range region and a location of the auxiliary control region;
   detecting, by the terminal on the touchscreen display, a user action dragging the first icon to a first position in the auxiliary control region;
   responsive to the user action and in accordance with the mapping relationship, obtaining, by the terminal, a first effect range in the candidate effect range region according to the first position in the auxiliary control region; and
   performing, by the terminal, the first operation corresponding to the first icon on a virtual target in the obtained first effect range.

2. The method according to claim 1, further comprising:
   detecting, by the terminal on the touchscreen display, a second user action comprising moving out of the auxiliary control region; and
   responsive to the second user action, cancelling, by the terminal, the first effect range.

3. The method according to claim 1, wherein the auxiliary control region and the candidate effect range region are geometrically similar.

4. The method according to claim 3, wherein obtaining, by the terminal, the first effect range in the candidate effect region according to the first position comprises:
   obtaining, by the terminal, a direction from a central point of the auxiliary control region to the first position, a first distance between the position and the central point, a second distance between the central point and an edge of the auxiliary control region along the direction, and a third distance between a central point of the candidate effect range region and an edge of the candidate effect range region along the direction;
   calculating, by the terminal, a ratio of the first distance to the second distance; and
   obtaining, by the terminal according to the ratio, a point on the third distance starting from the central point of the candidate effect range region along the direction, and obtaining the first effect range according to the obtained point.

5. The method according to claim 1, wherein the auxiliary control region and the candidate effect range region are both circles, and obtaining, by the terminal, the first effect range in the candidate effect region according to the first position comprises:
   obtaining a distance and a direction from the circle center of the auxiliary control region to the first position, and respective radii of the candidate effect range region and the auxiliary control region; and
   obtaining a point on the radius of the candidate effect range region along the direction according to a ratio of the radius of the candidate effect range region to the radius of the auxiliary control region, and obtaining the first effect range according to the obtained point.

6. The method according to claim 1, further comprising:
   detecting, by the terminal, a second user touch acting on a second icon displayed on the touchscreen display, the second icon corresponding to a second operation of the online game;
   responsive to a second user action dragging the second icon to a second position in the auxiliary control region, obtaining, by the terminal, a second effect range in the candidate effect range region according to the second position; and
   replacing, by the terminal, the first operation with performing, on a virtual target in the obtained second effect range, the second operation corresponding to the second icon.

7. The method according to claim 1, further comprising:
before displaying the auxiliary control region and the candidate effect range region,
determining, by the terminal, movement of the first user touch;
when the first user touch is moved, performing, by the terminal, the step of displaying the auxiliary control region and the candidate effect range region; and
when the first user touch is static and an operation determining event is detected, obtaining a locked virtual target, determining, by the terminal, the first effect range according to a location of the locked virtual target, and performing, on the virtual target in the corresponding first effect range, the first operation corresponding to the first icon.

8. The method according to claim 1, wherein the candidate effect range region is determined according to a location of a current user game character; and the first operation comprises at least one of: changing a game attribute value of the virtual target, adding a specified state to the virtual target, or restricting mobility of the virtual target.

9. A terminal, comprising:
a processor;
a touchscreen display;
a nonvolatile storage medium; and
a plurality of instructions stored in the nonvolatile storage medium, which, when executed by the processor, cause the terminal to perform a plurality of operations including:
detecting, by the terminal, a first user touch acting on a first icon displayed on the touchscreen display, the first icon corresponding to a first operation of an online game;
in response to detecting the first user touch:
displaying, by the terminal, an auxiliary control region and a candidate effect range region on the touchscreen display, wherein (1) the auxiliary control region is a first predetermined area of the touchscreen display, (2) the candidate effect range region is a second predetermined area of the touchscreen display, (3) the candidate effect range region occupies a larger area of the touchscreen display than the auxiliary control region and (4) the distance between the candidate effect range and the first icon is greater than the distance between the auxiliary control region and the first icon; and
establishing, by the terminal, a mapping relationship between a location of the candidate effect range region and a location of the auxiliary control region;
detecting, by the terminal on the touchscreen display, a user action dragging the first icon to a first position in the auxiliary control region;
responsive to the user action and in accordance with the mapping relationship, obtaining, by the terminal, a first effect range in the candidate effect range region according to the first position in the auxiliary control region; and
performing, by the terminal, the first operation corresponding to the first icon on a virtual target in the obtained first effect range.

10. The terminal according to claim 9, wherein the plurality of operations includes:
detecting, by the terminal on the touchscreen display, a second user action comprising moving out of the auxiliary control region; and
responsive to the second user action, cancelling, by the terminal, the first effect range.

11. The terminal according to claim 9, wherein the auxiliary control region and the candidate effect range region are geometrically similar.

12. The terminal according to claim 11, wherein obtaining, by the terminal, the first effect range in the candidate effect region according to the first position comprises:
obtaining, by the terminal, a direction from a central point of the auxiliary control region to the first position, a first distance between the position and the central point, a second distance between the central point and an edge of the auxiliary control region along the direction, and a third distance between a central point of the candidate effect range region and an edge of the candidate effect range region along the direction;
calculating, by the terminal, a ratio of the first distance to the second distance; and
obtaining, by the terminal according to the ratio, a point on the third distance starting from the central point of the candidate effect range region along the direction, and obtaining the first effect range according to the obtained point.

13. The terminal according to claim 11, wherein the auxiliary control region and the candidate effect range region are both circles, and obtaining, by the terminal, the first effect range in the candidate effect region according to the first position comprises:
obtaining a distance and a direction from the circle center of the auxiliary control region to the first position, and respective radii of the candidate effect range region and the auxiliary control region; and
obtaining a point on the radius of the candidate effect range region along the direction according to a ratio of the radius of the candidate effect range region to the radius of the auxiliary control region, and obtaining the first effect range according to the obtained point.

14. The terminal according to claim 9, wherein the plurality of operations include:
detecting, by the terminal, a second user touch acting on a second icon displayed on the touchscreen display, the second icon corresponding to a second operation of the online game;
responsive to a second user action dragging the second icon to a second position in the auxiliary control region, obtaining, by the terminal, a second effect range in the candidate effect range region according to the second position; and
replacing, by the terminal, the first operation with performing, on a virtual target in the obtained second effect range, the second operation corresponding to the second icon.

15. The terminal according to claim 9, wherein the plurality of operations include:
before displaying the auxiliary control region and the candidate effect range region,
determining, by the terminal, movement of the first user touch;
when the first user touch is moved, performing, by the terminal, the step of displaying the auxiliary control region and the candidate effect range region; and
when the first user touch is static and an operation determining event is detected, obtaining a locked virtual target, determining, by the terminal, the first effect range according to a location of the locked virtual target, and performing, on the virtual target in the corresponding first effect range, the first operation corresponding to the first icon.

16. The terminal according to claim 9, wherein the candidate effect range region is determined according to a location of a current user game character; and the first operation comprises at least one of: changing a game attribute value of the virtual target, adding a specified state to the virtual target, or restricting mobility of the virtual target.

17. A non-transitory computer readable storage medium storing programs in connection with a terminal having one or more processors and a touchscreen display, wherein the programs, when executed by the one or more processors, cause the terminal to perform a plurality of operations including:

detecting, by the terminal, a first user touch acting on a first icon displayed on the touchscreen display, the first icon corresponding to a first operation of an online game;

in response to detecting the first user touch:

displaying, by the terminal, an auxiliary control region and a candidate effect range region on the touchscreen display, wherein (1) the auxiliary control region is a first predetermined area of the touchscreen display, (2) the candidate effect range region is a second predetermined area of the touchscreen display, (3) the candidate effect range region occupies a larger area of the touchscreen display than the auxiliary control region and (4) the distance between the candidate effect range and the first icon is greater than the distance between the auxiliary control region and the first icon; and establishing, by the terminal, a mapping relationship between a location of the candidate effect range region and a location of the auxiliary control region;

detecting, by the terminal on the touchscreen display, a user action dragging the first icon to a first position in the auxiliary control region;

responsive to the user action and in accordance with the mapping relationship, obtaining, by the terminal, a first effect range in the candidate effect range region according to the first position in the auxiliary control region; and performing, by the terminal, the first operation corresponding to the first icon on a virtual target in the obtained first effect range.

\* \* \* \* \*